US011166272B2

(12) United States Patent
Abedini et al.

(10) Patent No.: US 11,166,272 B2
(45) Date of Patent: Nov. 2, 2021

(54) OPPORTUNISTIC COMMUNICATIONS IN INTEGRATED ACCESS AND BACKHAUL

(71) Applicant: QUALCOMM Incorporated, San Diego, CA (US)

(72) Inventors: Navid Abedini, Somerset, NJ (US); Jianghong Luo, Skillman, NJ (US); Luca Blessent, Whitehouse Station, NJ (US); Karl Georg Hampel, Hoboken, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/813,406

(22) Filed: Mar. 9, 2020

(65) Prior Publication Data

US 2020/0337048 A1    Oct. 22, 2020

Related U.S. Application Data

(60) Provisional application No. 62/836,418, filed on Apr. 19, 2019.

(51) Int. Cl.
*H04W 72/04* (2009.01)
*H04W 16/06* (2009.01)
*H04W 88/08* (2009.01)

(52) U.S. Cl.
CPC ....... *H04W 72/0433* (2013.01); *H04W 16/06* (2013.01); *H04W 72/042* (2013.01); *H04W 88/085* (2013.01)

(58) Field of Classification Search
CPC ......... H04W 72/0473; H04W 72/0446; H04W 72/0453; H04W 72/048; H04W 72/1289;
(Continued)

(56) References Cited

U.S. PATENT DOCUMENTS

2012/0156984 A1    6/2012  Gan et al.
2014/0293968 A1*  10/2014  Ebrahimi Tazeh Mahalleh .......... H04W 56/001
                                                                                370/336
(Continued)

OTHER PUBLICATIONS

AT&T: "Enhancements to Support NR Backhaul Links," 3GPP Draft, 3GPP TSG RAN WG1 Meeting #94bis, R1 -1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".
(Continued)

*Primary Examiner* — Kwasi Karikari
(74) *Attorney, Agent, or Firm* — Procopio, Cory, Hargreaves & Savitch LLP

(57) ABSTRACT

Efficient opportunistic communications in integrated access and backhaul (IAB) frameworks are provided allowing scheduling nodes and scheduled nodes to communicate within an allocated set of resources based on a different configuration than for non-opportunistic communications using a different set of resources. An additional set of available resources may be allocated for coordinated communications between a parent IAB-node and the child IAB-node. Resources within this available set are associated with a first configuration, and when prior coordination exists, the parent IAB-node and child IAB-node may communicate based on this first configuration over this available set of resources. However, when prior coordination does not exist, the parent IAB-node and child IAB-node may opportunistically communicate over the allocated set of resources based on a second configuration different than the first
(Continued)

configuration. Using different configurations, power may be conserved and resources managed more efficiently in opportunistic communications where unsuccessful transmissions may be more likely.

100 Claims, 13 Drawing Sheets

(58) Field of Classification Search
CPC . H04W 52/243; H04W 72/044; H04W 72/06; H04W 72/08; H04W 16/10; H04W 24/10; H04W 72/04; H04W 16/28; H04W 28/26
See application file for complete search history.

(56) References Cited

U.S. PATENT DOCUMENTS

| | | |
|---|---|---|
| 2016/0192382 A1 | 6/2016 | Soldati et al. |
| 2016/0353424 A1* | 12/2016 | Stirling-Gallacher ..................... H04B 7/0626 |
| 2018/0098349 A1* | 4/2018 | Sun ................... H04W 72/0406 |
| 2019/0116605 A1 | 4/2019 | Luo et al. |
| 2020/0044732 A1* | 2/2020 | Cui ....................... H04W 76/50 |
| 2020/0112953 A1* | 4/2020 | Bendlin ................. H04L 5/005 |

OTHER PUBLICATIONS

International Search Report and Written Opinion—PCT/US2020/021878—ISA/EPO—dated Jun. 16, 2020.

\* cited by examiner

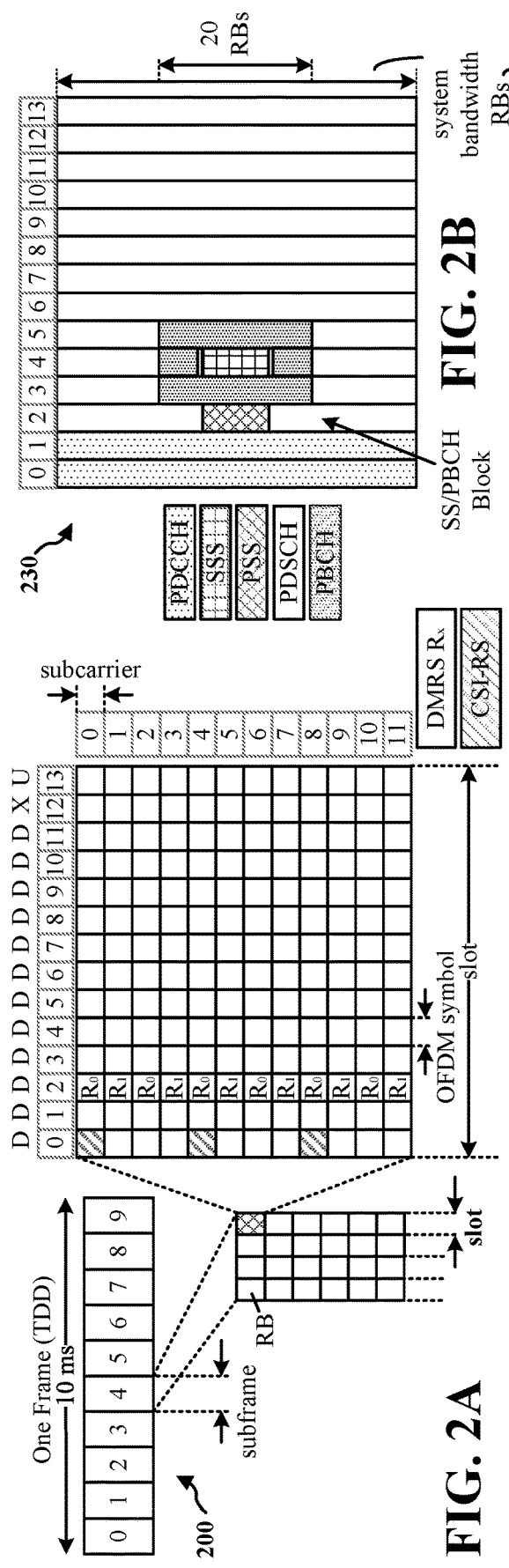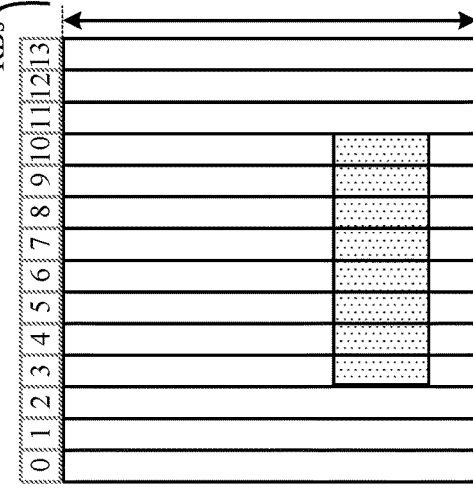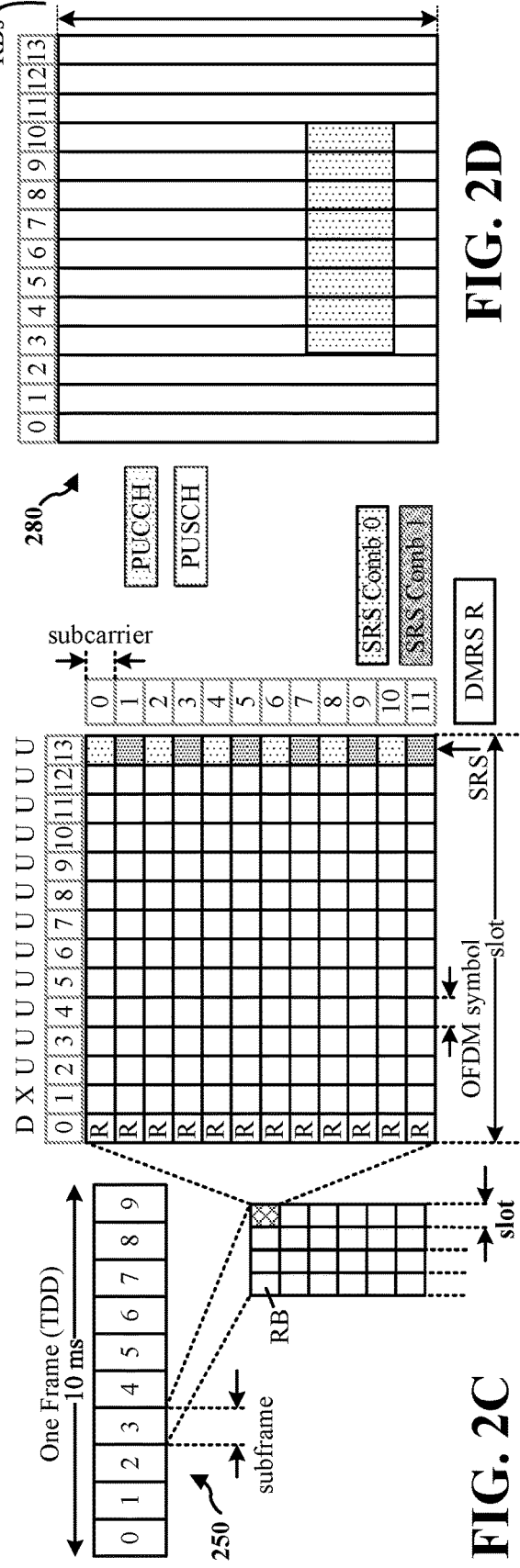
FIG. 2A  FIG. 2B  FIG. 2C  FIG. 2D

OPPORTUNISTIC COMMUNICATIONS IN INTEGRATED ACCESS AND BACKHAUL

CROSS REFERENCE TO RELATED APPLICATION(S)

This application claims the benefit of U.S. Provisional Application Ser. No. 62/836,418, entitled "OPPORTUNISTIC COMMUNICATIONS IN INTEGRATED ACCESS AND BACKHAUL" and filed on Apr. 19, 2019, which is expressly incorporated by reference herein in its entirety.

BACKGROUND

Technical Field

The present disclosure relates generally to communication systems, and more particularly, to a wireless communication system between a scheduling node and a scheduled node.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In integrated access and backhaul (IAB), a typical architecture may include at least one IAB-donor base station, at least one IAB-node (e.g. a base station) wirelessly connecting to the IAB-donor base station, and at least one UE wirelessly connecting to the IAB-node. IAB-nodes may also wirelessly connect to other IAB-nodes, forming a topological structure of parent nodes and child nodes.

The IAB-donor base station includes a central unit (CU) and a distributed unit (DU). Moreover, each IAB-node includes a mobile termination unit (MT) and a DU. The CU semi-statically allocates a set of resources to the DUs (e.g. over the F1-Application Protocol (F1-AP) interface) for the IAB-nodes to use to communicate with their children (e.g. UEs or other IAB-nodes). Each DU may also dynamically allocate resources within its allocated, semi-static set of resources to schedule the communication of its child nodes.

A parent node (e.g. an IAB-node) may dynamically allocate (or receives allocation from the CU of) a parent set of resources and a child set of resources. The parent set of resources is for the parent node to use in communicating with one of its child nodes (e.g. another IAB-node or UE). The child set of resources is for the child node to use when communicating with its own child nodes (e.g. additional UEs). The parent set of resources are the same as the child set of resources and are both comprised within the allocated set of resources.

Situations may arise where a scheduling node which allocates or schedules resources (e.g. a parent IAB-node), or a scheduled node which receives scheduled resources (e.g. a child IAB-node), may each be potentially unavailable for communication with the other node using the same allocated set of resources. In certain cases where prior coordination between the nodes exists, either node may determine not to communicate with the other since successful communication is not guaranteed. In other cases where prior coordination between the nodes may be lacking, the scheduling node or the scheduled node may still attempt to communicate with each other when an opportunity arises (e.g. opportunistic communications). However, opportunistic communications between scheduling nodes and scheduled nodes without prior coordination may inefficiently waste power or resources since there is no guarantee one node will successfully receive or transmit information to the other node.

To provide more efficiency in opportunistic communications, the present disclosure allows the scheduling nodes and scheduled nodes to communicate within the allocated set of resources based on a different configuration than for non-opportunistic (e.g. coordinated) communications using a different set of resources. In one aspect, an additional set of available resources may be allocated for coordinated communications between the parent IAB-node and the child IAB-node. Resources within this available set are associated with a first configuration (e.g. a first modulation coding scheme (MCS), a first beam, a first communication rank, a first resource configuration, a first transmission power, or a first timing reference), and when prior coordination exists, the parent IAB-node and child IAB-node may communicate based on this first configuration over this available set of resources. However, when prior coordination does not exist, the parent IAB-node and child IAB-node may opportunistically communicate over the allocated set of resources based on a second configuration different than the first configuration (e.g. a second MCS, a second beam, a second communication rank, a second resource configuration, a second transmission power, or a second timing reference). Using different configurations for coordinated and opportunistic (uncoordinated) communications, power may be conserved and resources managed more efficiently in opportunistic communications where unsuccessful transmissions may be more likely.

In an aspect of the disclosure, a method, a computer-readable medium, and an apparatus are provided. The apparatus may be a scheduling node. The apparatus determines an allocation of a set of resources for communication with a scheduled node, where the allocation comprises at least a first set of resources and a second set of resources. The first set of resources is configured for coordinated communication between the scheduling node and the scheduled node, and the second set of resources is configured for uncoordinated communication between the scheduling node and the scheduled node. After the allocation of the set of resources is determined, the apparatus communicates with the scheduled node using at least one of the first set of resources based on a first configuration or the second set of resources based on a second configuration different than the first configuration.

In another aspect of the disclosure, a method, a computer-readable medium, and an apparatus are provided. The apparatus may be a scheduled node. The apparatus receives an allocation of a set of resources for communication with a scheduling node, where the allocation comprises at least a first set of resources and a second set of resources. The first set of resources is configured for coordinated communication between the scheduling node and the scheduled node, and the second set of resources is configured for uncoordinated communication between the scheduling node and the scheduled node. After the allocation of the set of resources is received, the apparatus communicates with the scheduling node using at least one of the first set of resources based on a first configuration or the second set of resources based on a second configuration different than the first configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
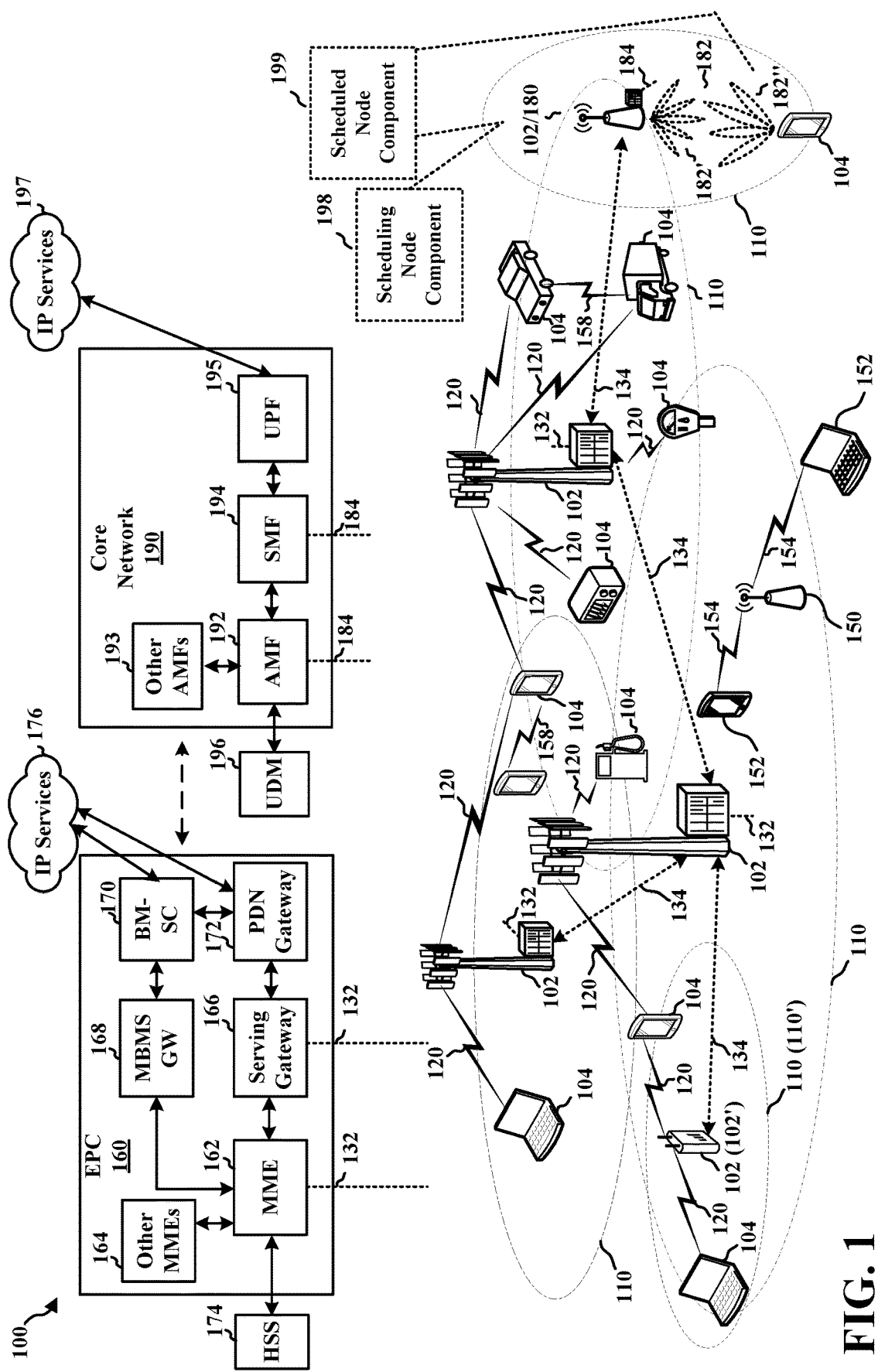
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may include a scheduling node component 198 that is configured to determine an allocation of a set of resources for communication with a scheduled node, where the allocation comprises at least a first set of resources and a second set of resources, where the first set of resources is configured for coordinated communication between the scheduling node and the scheduled node, and where the second set of resources is configured for uncoordinated communication between the scheduling node and the scheduled node. The scheduling node component 198 is also configured to communicate with the scheduled node using at least one of the first set of resources based on a first configuration or the second set of resources based on a second configuration different than the first configuration.

In other aspects, the UE 104 may include a scheduled node component 199 that is configured to receive an allocation of a set of resources for communication with a scheduling node, where the allocation comprises at least a first set of resources and a second set of resources, where the first set of resources is configured for coordinated communication between the scheduling node and the scheduled node, and where the second set of resources is configured for uncoordinated communication between the scheduling node and the scheduled node. The scheduled node component 199 is also configured to communicate with the scheduling node using at least one of the first set of resources based on a first configuration or the second set of resources based on a second configuration different than the first configuration. The base station 102/180 may also include the scheduled node component 199.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
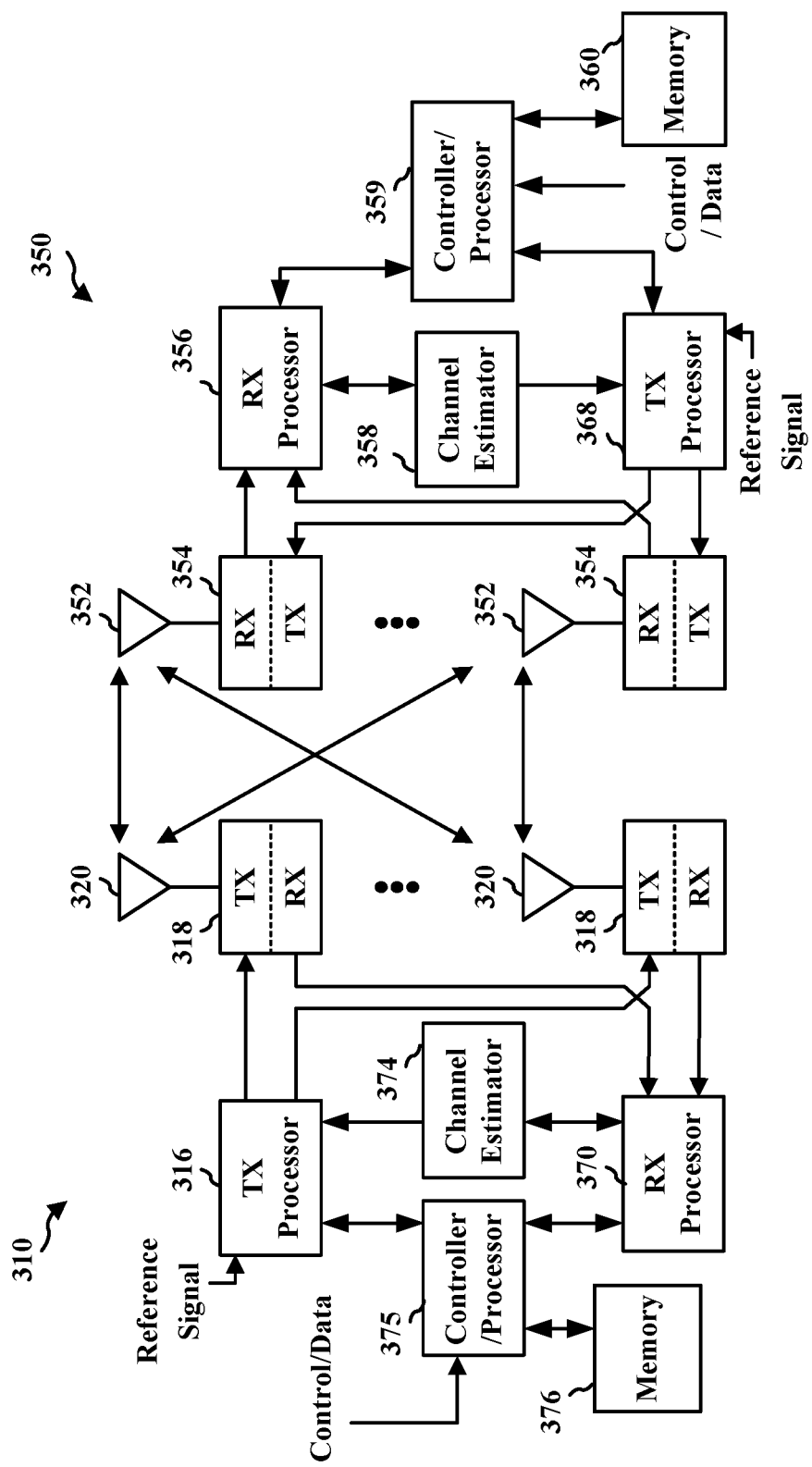
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with scheduled node component 199 of FIG. 1.

At least one of the TX processor 316, the RX processor 370, and the controller/processor 375 may be configured to perform aspects in connection with scheduling node component 198 or scheduled node component 199 of FIG. 1.

Figure 4:
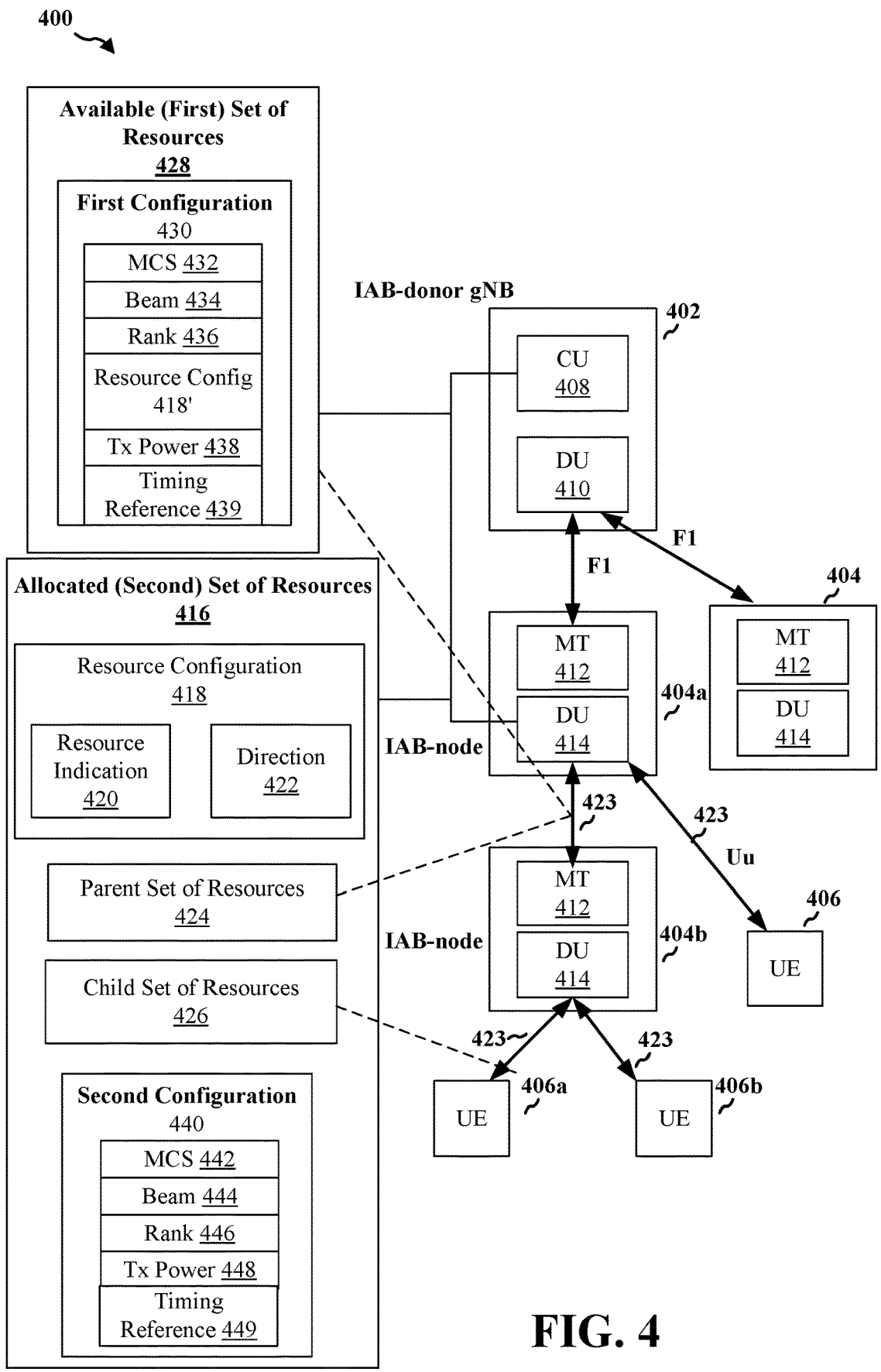
FIG. 4 is a diagram illustrating an example framework providing resource management in integrated access and backhaul (IAB).

FIG. 4 shows an example framework 400 providing resource management in integrated access and backhaul (IAB). The IAB framework 400 may include at least one IAB-donor base station 402, at least one IAB-node 404 (e.g. base stations 102/180) wirelessly connecting to the IAB-donor base station 402 (e.g. over an F1 interface), and at least one UE 406 (e.g. UE 104) wirelessly connecting to the IAB-node 404 (e.g. over a Uu interface). IAB-nodes 404 may also wirelessly connect to other IAB-nodes 404, forming a topological structure of parent nodes and child nodes as illustrated, for example, in FIG. 4.

The IAB-donor base station 402 includes a central unit (CU) 408 and a distributed unit (DU) 410 (hereinafter referred to as a "donor DU" 410). Moreover, each IAB-node 404 includes a mobile termination unit (MT) 412 and a DU 414 (hereinafter referred to as DU 414). The CU 408 semi-statically allocates a set of resources 416 to the DUs 414 (e.g. over the F1-Application Protocol (F1-AP) interface) for the IAB-nodes 404 to use to communicate with their children (e.g. UEs 406 or other IAB-nodes 404). The CU 408 may also configure MTs 412 and UEs 406 with certain semi-static or RRC-configured schedules or time configurations, for example, a dedicated time-division duplexing (TDD) configuration, control-resource sets (CORESETs), or semi-persistent scheduling (SPS). Each DU 414 may dynamically allocate resources within its allocated, semi-static set of resources 416 to schedule the communication of its child nodes. Moreover, each DU 414 may dynamically release certain resources (e.g. soft resources, discussed below) for the DU 414 of a child node to use if the parent node does not need to use those resources.

Each time resource in the set of resources 416 allocated to a DU 414 is indicated or labeled with a resource configuration 418 including a resource indication 420 (e.g. hard, soft, or not-available) and a direction 422 (e.g. downlink, uplink, or flexible). When the resource indication 420 is hard, the DU 414 may communicate with its child nodes (e.g. over child links 423) subject to the indicated direction 422. For example, when resource indication 420 is hard, IAB-node 404a may send downlink communications to IAB-node 404b or UE 406 if direction 422 is downlink, IAB-node 404a may receive uplink communications from IAB-node 404b or UE 406 if the direction 422 is uplink, or IAB-node 404a can locally determine whether to send downlink communications or receive uplink communications if the direction 422 is flexible. In the case of hard DU resources, the DU of the parent node or the child node can assume it can use the resource regardless of the MT's configuration. However, exceptions may arise for specific signals/channels to be transmitted or received by the MT in the same resource (e.g. SS/PBCH blocks, SI reception, RACH).

Alternatively, when the resource indication 420 is soft, the DU 414 may communicate with its child nodes subject to the indicated direction 422 only if the DU 414 of its parent node releases the resource (e.g. indicates the resource as available). For example, when resource indication 420 is soft, IAB-node 404b may send downlink communications to or receive uplink communications from its own child nodes (e.g. UEs 406a and 406b) if it receives an indication from its parent IAB-node 404a that the resource is released and available for use. In the case of soft DU resources, if the soft resource is indicated as available, the DU of the parent node or the child node can assume it can use the resource. Alternatively, if the soft resource is not indicated as available, the DU cannot assume it can use the resource. The use of soft resources may at least correspond to transmission/reception of specific signals and channels (e.g. PDSCH/PUSCH) at the DU. For example, soft resources may be used for cell-specific signals (e.g. SS/PBCH blocks, SI reception, RACH) signals and channels which may potentially be transmitted or received at the DU. Additionally, the availability of soft resources at the parent node or child node may be explicitly or implicitly indicated. For example, in case of implicit indication of DU soft resource availability, the IAB node may know that the DU resource can be used without impacting the MT's ability to transmit/receive according to its configuration and scheduling based on indirect means. Moreover, explicit indication that a resource is available may be based on DCI indication.

Finally, when the resource indication 420 is not-available, the DU 414 may not communicate with its child nodes using the corresponding resource. If a resource is configured as not available, the DU of the parent node or the child node cannot assume it can use the resource.

In one aspect, a parent node (e.g. IAB-node 404a) may dynamically allocate (or receives allocation from the CU 408 of) a parent set of resources 424 and a child set of resources 426. The parent set of resources 424 is for the parent node to use in communicating with one of its child nodes (e.g. IAB-node 404b or UE 406). The child set of resources 426 is for the child node (e.g. IAB-node 404b) to use when communicating with its own child nodes (e.g. UEs 406a,b). The parent set of resources 424 are the same as the child set of resources 426 and are both comprised within the allocated set of resources 416.

Certain cases may arise where a parent node may not be allowed to freely use the allocated set of resources 416 to communicate with its child nodes, or vice-versa. In a first example, the parent set of resources 424 and child set of resources 426 may both be associated with resource indications 420 which are labeled hard (e.g. HARD∥HARD), and the child IAB-node 404b may be configured to communicate in half-duplex. As a result, a conflict may arise if the child IAB-node 404b schedules a downlink transmission using the child set of resources 426 at the same time that parent IAB-node 404a schedules its own downlink transmission to child IAB-node 404b using the parent set of resources 424. In such case, while the DU 414 of child IAB-node 404b may use its child set of resources 426 to communicate without considering the schedule of its co-located MT 412 (e.g. over a parent backhaul link), the DU 414 of parent IAB-node 404a may yield its parent set of resources 424 on the expectation that the child node will be unavailable for communication with the parent node.

In a second example, the child set of resources 426 may be associated with a resource indication 420 which is labeled soft (for example, HARD∥SOFT), and the parent IAB-node 404a may release the child set of resources 426 for the child IAB-node 404b to flexibly use to communicate with its own children (e.g. UEs 406a,b). As a result, child IAB-node 404b may expect parent IAB-node 404a not to use its parent set of resources 424 to communicate with the child node 404b unless the parent node 404a reclaims the child set of resources 426.

In a third example, the parent set of resources 424 and child set of resources 426 may both be associated with resource indications 420 which are labeled hard (e.g. HARD∥HARD), and the child IAB-node 404b may decide to send an uplink transmission to parent IAB-node 404a over the child set of resources 426. For example, child IAB-node 404b may send a scheduling request (SR), a random access channel (RACH) transmission, or a scheduled uplink transmission (e.g. a SRS or information on PUSCH) over the child set of resources 426. Since the parent IAB-node 404a expects the child node 404b to be unavailable for communication due to both resource indications 420 being labeled hard as described above, the parent IAB node 404a may be idle or be in the process of communicating with other child nodes. As a result, there may no guarantee that the uplink transmission will be successfully received at parent IAB-node 404a.

Thus, situations such as those described above may arise where a scheduling node which allocates or schedules resources (e.g. parent IAB-node 404a with DU 414), or a scheduled node which receives scheduled resources (e.g. child IAB-node 404b with MT 412, or UE 406), may each be potentially unavailable for communication with the other node using the allocated set of resources 416. As a result, in certain cases where prior coordination between the nodes exists, either node may determine not to communicate with the other based on its knowledge of the resource configurations 418.

For example, inter-IAB node conflict resolution may be supported by one or more of the following options: the parent node is aware of all of the DU resource configurations (D/U/F/hard [H]/soft [S]/not-available [NA]) of its child IAB node DUs, or the parent node may be aware of a subset of the DU resource configurations (D/U/F/H/S/NA) of its child IAB node DUs. The indication of the child DU resources at the parent node may be via explicit means (e.g. F1-AP signaling) or implicit means (e.g. based on child MT configuration). Thus, if parent node is made aware of child node's resource configurations or is aware of a subset of these resource configurations (via explicit signaling or based on the child node's MT configuration), the parent node may prevent conflicts by yielding hard resources centrally and semi-statically controlled by the CU (since the parent node may not expect the child's MT to be available for communication within these resources), or by releasing/reclaiming soft resources locally and dynamically controlled by the parent node's DU.

Thus, prior coordination between a scheduling node and a scheduled node may exist when the scheduling node is made aware of scheduled node information (or when the scheduled node is made aware of scheduling node information), either explicitly by the CU or implicitly or locally by the scheduled/scheduling node. For example, such information may include a duplexing or multiplexing capability of the scheduled node or scheduling node (e.g. spatial division multiplexing (SDM), full duplex or half duplex), conditions for the multiplexing capability of the scheduled node or scheduling node (e.g. a maximum MCS, a maximum Tx/Rx power, link budget constraints, etc.), and/or at least a subset of the resource configuration(s) of the scheduled node or scheduling node. For instance, prior coordination may exist between IAB-node 404a and IAB-node 404b when CU 408 explicitly signals IAB-node 404a (via DU 410) with the resource configuration 418 for IAB-node 404b, including resource indication 420 and direction 422, a multiplexing or duplexing capability of IAB-node 404b, etc., maximum MCS, Tx/Rx power or other conditions, etc. In another example, prior coordination may exist when CU 408 explicitly signals IAB-node 404b with such information and IAB node 404b locally indicates the resource configuration 418 (e.g. via MT 412) to IAB node 404a.

Therefore, in cases where prior coordination between the nodes exists, the scheduling node and scheduled node may communicate with each other accordingly (e.g. coordinated communications). However, in other cases where prior coordination between the nodes may be lacking, the scheduling node or the scheduled node may still attempt to communicate with each other when an opportunity arises (e.g. opportunistic or uncoordinated communications). For instance, even if the allocated set of resources 416 is (HARD∥HARD) and the parent IAB-node 404a thus expects the child IAB-node 404b or UE 406 to be unavailable for communication (e.g. since the parent node may not be aware that the child IAB node has full duplexing capability due to lack of prior coordination and thus the parent node assumes the child node operates under half duplexing), the child node may still possibly communicate with the parent node over the parent set of resources 424 if, for example, the child node has advanced spatial division multiplexing (SDM) and/or full-duplex capabilities, the child link 423 is idle, or the child node decides to prioritize communication with the parent node. However, opportunistic or uncoordinated communications between scheduling nodes and scheduled nodes without prior coordination may inefficiently waste power or resources since there is no guarantee one node will successfully receive or transmit information to the other node.

To provide more efficiency in opportunistic communications, the present disclosure allows the scheduling nodes and scheduled nodes to communicate within the allocated set of resources 416 based on a different configuration than for non-opportunistic (e.g. coordinated) communications using a different set of resources. In one aspect, an additional set of available resources 428 may be allocated for coordinated communications between the parent IAB-node 404a and the child IAB-node 404b. For example, the additional set of resources 428 may be guaranteed for communication based on prior coordination between the parent and child nodes. Resources within this available set 428 are associated with a first configuration 430 (e.g. a first modulation coding scheme (MCS) 432, a first beam 434, a first communication rank 436, a first resource configuration 418', a first transmission power 438, or a first timing reference 439), and when prior coordination exists, the parent IAB-node 404a and child IAB-node 404b may communicate based on this first configuration 430 over this available set of resources 428. However, when prior coordination does not exist, the parent IAB-node 404a and child IAB-node 404b may opportunistically communicate over the allocated set of resources 416 based on a second configuration 440 different than the first configuration 430 (e.g. a second MCS 442, a second beam 444, a second communication rank 446, a second resource configuration 418, or a second transmission power 448, or a second timing reference 449).

Using different configurations for coordinated and opportunistic communications, power may be conserved and resources managed more efficiently in opportunistic communications where unsuccessful transmissions may be more likely. For example, with prior coordination, a parent IAB-node 404a may generally communicate with child IAB-node 404b or UE 406, and vice-versa, using the set of available resources 428 based on a specific MCS (e.g. 16 QAM), with a particular beam direction, with a specific rank indicator (e.g. 2×2 multiple-input-multiple-output (MIMO)), within hard resources, and/or at a high transmission power. The parent and child nodes may communicate accordingly based on an expectation of successful transmission through prior coordination. However, if the nodes attempt to communicate with each other using opportunistic communication, either node may potentially be unavailable for communication (e.g. due to a shared set of allocated resources 416 and circumstances such as half-duplex communication and (HARD∥HARD) conflict resolution rules). Therefore the nodes may modify the aforementioned MCS, beam, rank, resource indication, or transmission power to account for the lower likelihood of successful transmission. For instance, parent IAB-node 404a may communicate with child IAB-node 404b or UE 406, and vice-versa, using the allocated set of resources based on a lower MCS (e.g. 4QAM), with a different beam direction, with a lower rank indicator (e.g. a single antenna), within soft resources, and/or at a lower transmission power. Various examples of how this second configuration may be configured for opportunistic communication are described in connection with FIGS. 5A-5C.

Figure 5A:
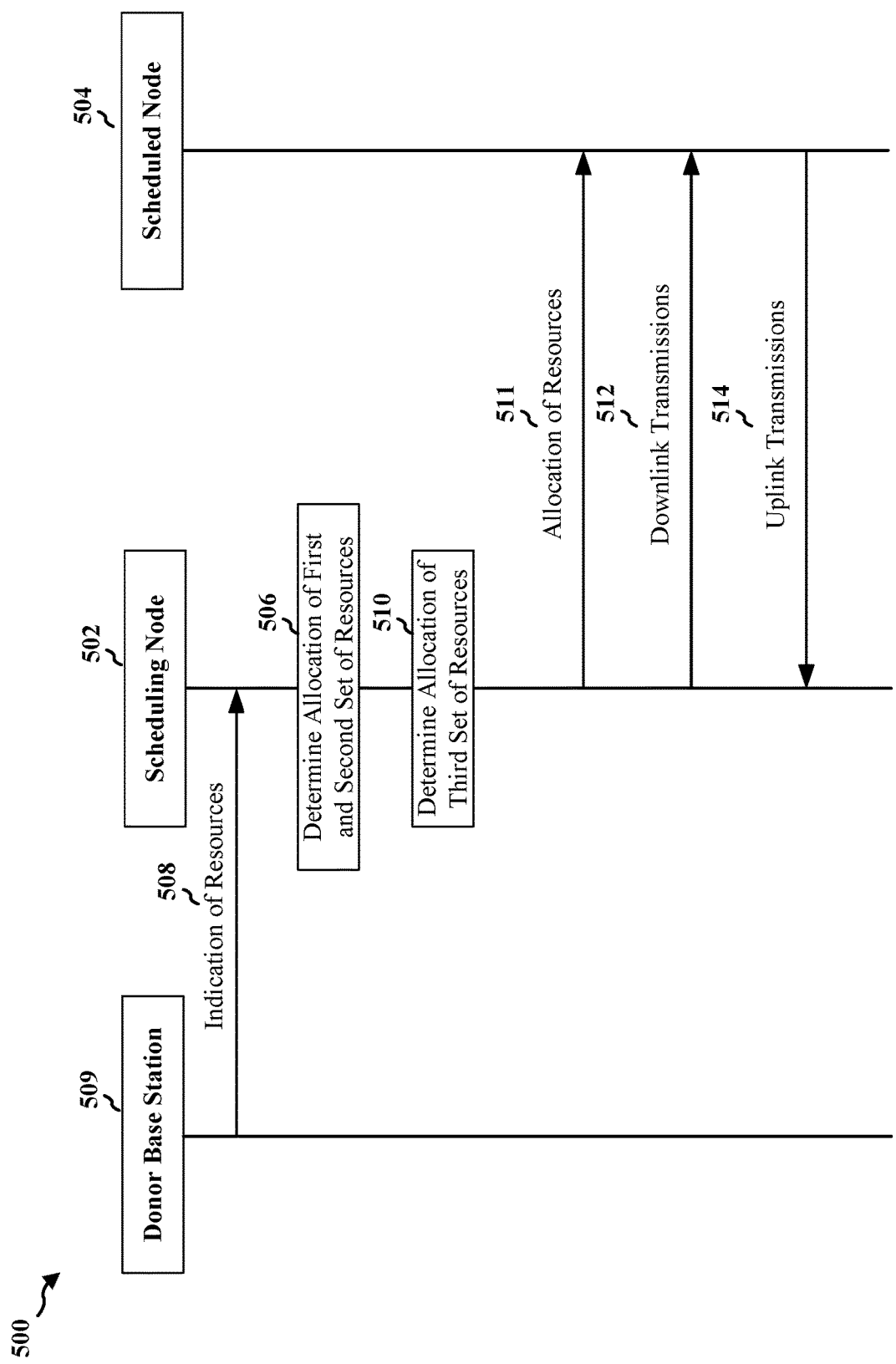
FIGS. 5A-5C are a call flow diagram showing wireless communication between a scheduling node and a scheduled node.
Figure 5B:
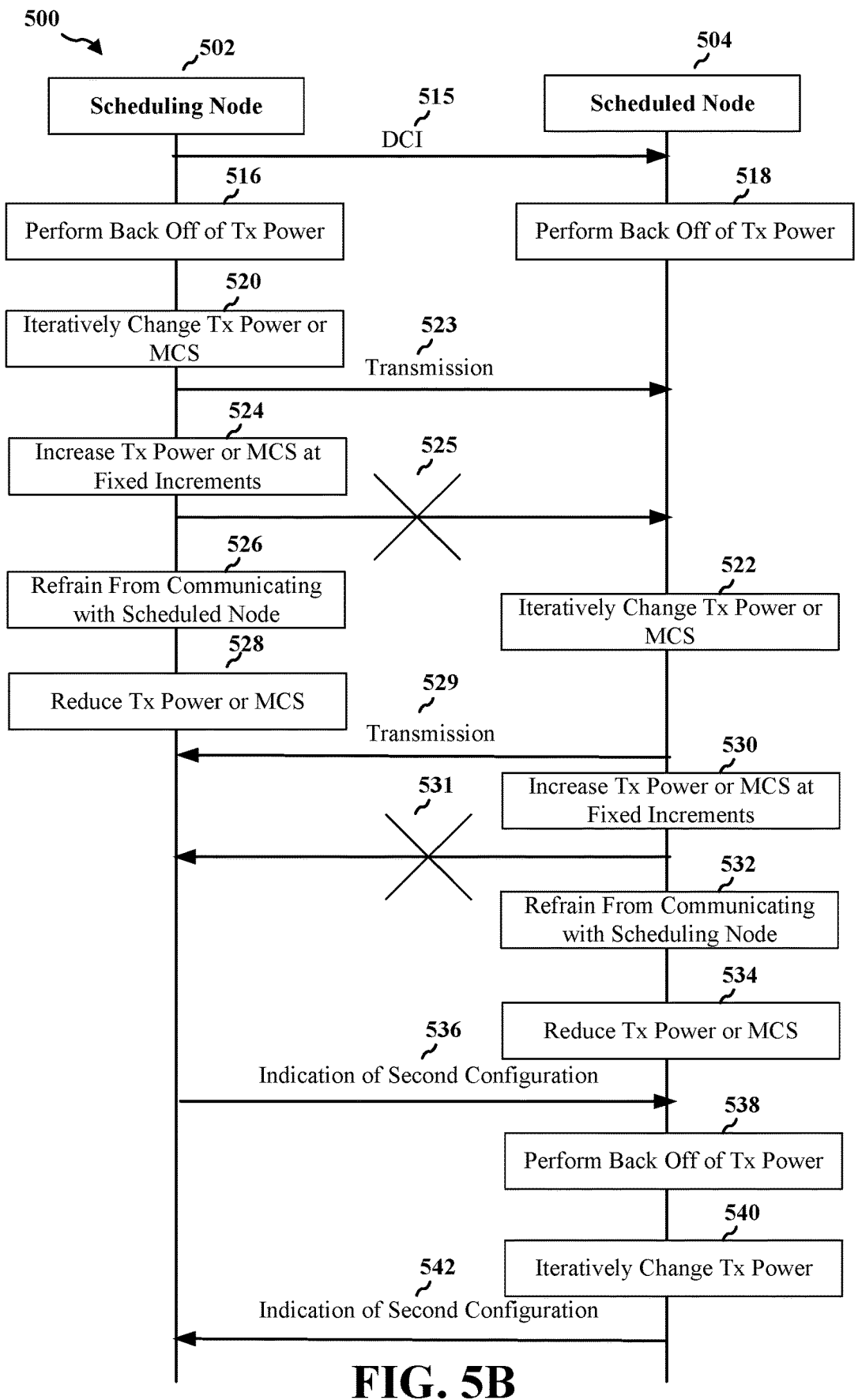
Figure 5C:
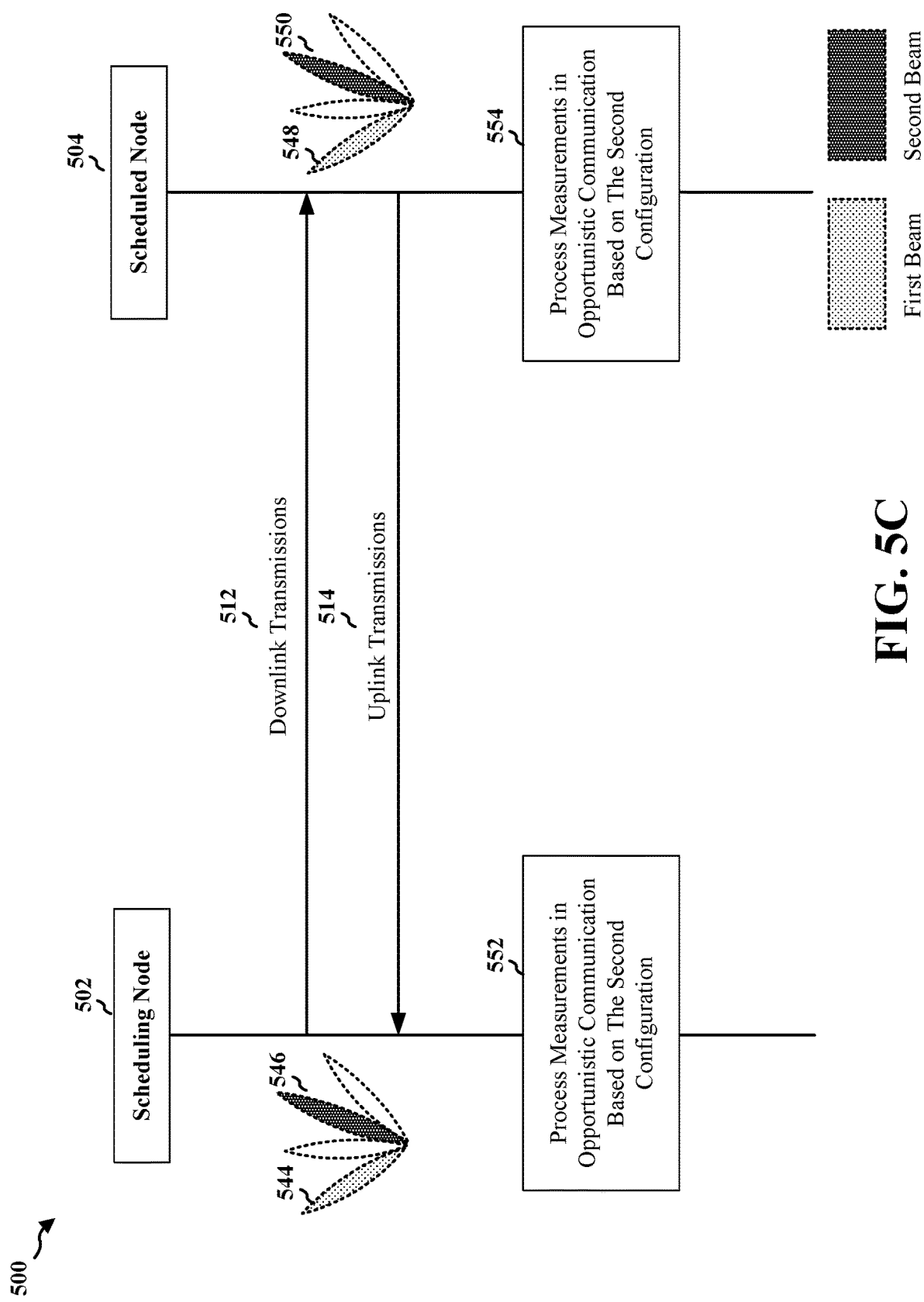

FIGS. 5A-5C are a call flow diagram 500 illustrating various examples of opportunistic communication based on the second configuration 440 in FIG. 4 between a scheduling node 502 (e.g. base station 102/180, 310, IAB node 404a) and a scheduled node 504 (e.g. UE 104, 350, 406a,b or base station 102/180, 310, IAB node 404b). Referring to FIG. 5A, the scheduling node determines at 506 an allocation of a set of resources for communication with the scheduled node. The allocated set of resources may include a first set of available resources for non-opportunistic communication (e.g. available set of resources 428 in FIG. 4) between the scheduling node and the scheduled node, which are associated with a first configuration (e.g. first configuration 430 in FIG. 4) when there is prior coordination between the nodes. The allocated set of resources may also include a second set of resources for opportunistic communication (e.g. allocated set of resources 416 in FIG. 4) between the scheduling node and the scheduled node, which are associated with a second configuration when either node 502, 504 is potentially unavailable for communication (e.g. when there is no prior coordination between the nodes).

In one aspect, the first and second sets of resources may be determined at 506 based on an indication received from a base station's CU (e.g. CU 408 of IAB-donor node 402 in FIG. 4). For example, scheduling node 502 may receive an indication 508 of the first and second set of resources from donor base station 509. In some aspects, the scheduling node 502 may also determine allocation of a third set of resources 510. This third set of resources 510 may be configured to be unavailable for communication with the scheduled node 504 (e.g. for use in backhaul communication of the scheduling node 502). After the scheduling node 502 determines at 506 the allocation of the set of resources (and optionally 510), the scheduling node 502 transmits the allocation of the set of resources 511 to the scheduled node 504.

Once the resources are allocated and the scheduled node 504 receives the allocated set of resources 511 (and 510), the scheduling node 502 may communicate with the scheduled node 504 using the first set of resources based on the first configuration and/or opportunistically using the second set of resources based on the second configuration. For example, the scheduling node 502 may send downlink transmissions 512 to the scheduled node 504 using either set of resources, and the scheduled node 504 may send uplink transmissions 514 to the scheduling node 502 using either set of resources. The second configuration may be different than the first configuration in accordance with various aspects as illustrated in FIGS. 5B and 5C.

Referring to FIG. 5B, in one aspect, the scheduling node 502 may dynamically schedule (e.g. using DCI 515) a downlink transmission to the scheduled node 504 and/or an uplink transmission from the scheduled node 504 over the second set of resources. In such case, the scheduling node may indicate the second configuration in DCI 515 to the scheduled node. The second configuration may also be based on a link (e.g. child link 423 in FIG. 4) between the scheduling node 502 and the scheduled node 504. For example, the scheduling node 502 or scheduled node 504 may use adaptive modulation or coding (e.g. link adaptation) to send downlink and uplink transmissions respectively over this link based on channel conditions using a different, selected MCS than in the first configuration. The scheduled downlink and/or uplink transmissions may also be communicated based on other selected characteristics (e.g. a communication rank or transmission power) different from those in the first configuration.

In one example of this aspect, when opportunistically sending a downlink transmission to the scheduled node 504, the scheduling node 502 may perform a back off 516 of its transmission power normally used for non-opportunistic or coordinated communications. Similarly, when opportunistically sending an uplink transmission to the scheduling node 502, the scheduled node 504 may perform a back off 518 of its transmission power normally used for coordinated communications. For instance, the scheduling node 502 and scheduled node 504 may communicate within the second set of resources using lower transmission power than within the first set of resources. If the transmission power of the first configuration already has a back off, the back off 516, 518 of the second configuration may be additionally reduced in transmission power compared to the first configuration. Moreover, the back off 516, 518 may be fixed, for instance, the transmission power may be reduced by a fixed amount in each scheduled downlink or uplink communication.

In another example of this aspect, when opportunistically sending a downlink transmission to the scheduled node 504, the scheduling node 502 may iteratively change 520 its transmission power or MCS based on whether its uncoordinated communication is successful. Similarly, when opportunistically sending an uplink transmission to the scheduling node 502, the scheduled node 504 may iteratively change 522 its transmission power or MCS based on whether its uncoordinated communication is successful.

For instance, the scheduling node 502 may initially send a transmission 523 with a transmission power and/or MCS at an initial configuration (e.g. a low transmission power or a low coding rate). If the transmission 523 is successful, the scheduling node 502 may increase 524 the transmission power and/or MCS at fixed increments up to a predetermined limit. This incremental increase is based on the node's expectation that subsequent transmissions will also be successful, so more power or higher coding rate can be used. However, if the prior transmission 523 or a subsequent transmission 525 is unsuccessful, the scheduling node 502 may refrain 526 from attempting to communicate with the scheduled node 504 for a predetermined period of time, or may reduce 528 its transmission power and/or MCS until the transmission is successful. For example, the node may refrain from communicating after the initial communication attempt, and reduce its power or coding rate after subsequent communication attempts.

Similarly, the scheduled node 504 may initially send a transmission 529 with a transmission power and/or MCS at an initial configuration. If the transmission 529 is successful, the scheduled node may increase 530 the transmission power and/or MCS at fixed increments up to a predetermined limit based on the node's expectation that subsequent transmissions will also be successful. If the prior or subsequent transmission 531 is unsuccessful, however, the scheduled node 504 may refrain 532 from attempting to communicate with the scheduling node 502 for a predetermined period of time or reduce 534 its transmission power and/or MCS until the transmission is successful.

The second configuration (e.g. the backed off transmission power and/or iteratively changed transmission power and MCS) may be preconfigured, or it may be received at the scheduling node 502 by the DU from a network or base station (e.g. donor base station 509). For example, referring to FIG. 4, DU 414 in IAB-node 404a may receive information regarding the back off amount, fixed increment and limits for the transmission power and/or MCS from CU 408 in IAB-donor node 402. The scheduling node 502 may also autonomously determine the second configuration (e.g. at DU 414 in FIG. 4) when attempting to opportunistically communicate with the scheduled node 504. For example, the scheduling node 502 may itself determine the amount of the back off or increments for its transmission power or MCS.

Additionally, the scheduling node 502 may provide the second configuration to the scheduled node 504 (e.g. in downlink control information (DCI)). The scheduled node 504 may receive the autonomously determined second configuration from the scheduling node 502 to use when attempting to opportunistically communicate with the scheduling node 502. For example, the scheduled node 504 may receive from the scheduling node 502 the amount of back off or increments for its transmission power or MCS to use when sending uplink transmissions to the scheduling node 502.

Still referring to FIG. 5B, in another aspect, the scheduling node 502 may send a semi-statically configured, downlink transmission to the scheduled node 504 using the second set of resources. For example, the transmission may be a reference signal, a semi-persistently scheduled grant for an uplink transmission on PUSCH, or an otherwise RRC-configured signal which is not transmitted within DCI. In such case, the scheduling node 502 may opportunistically communicate with the scheduled node 504 similarly based on a second configuration (e.g. a transmission power, a beam, a communication rank, a resource indication, and/or a MCS) different than the first configuration used in non-opportunistic communication.

In one example, the scheduling node 502 may autonomously determine the second configuration. For example, the scheduling node 502 may itself determine a reduced transmission power as discussed above. However, since transmissions in this aspect are semi-statically configured (without DCI), the scheduled node 504 may not be aware of the second configuration, leading to possible misinterpretations of transmissions. For example, if scheduling node 502 sends a reference signal over the second set of resources to scheduled node 504 using a lower transmission power than the transmission power corresponding to the first set of resources, the scheduled node 504 may misinterpret this lower transmission power as indicating path loss.

To prevent such misinterpretation, the scheduling node 502 may indicate 536 the second configuration to the scheduled node 504 (e.g. separately from DCI). Moreover, to increase the chance this indication 536 will be received successfully, the indication 536 may be communicated using the first set of resources. For example referring to FIG. 4, DU 414 of IAB-node 404a may send to the MT 412 of IAB-node 404b or to UE 406 using the available set of resources 428 information regarding a different transmission power, beam, communication rank, resource configuration 418, and/or MCS which will be used for opportunistic communication. The scheduling node may send the indication 536 of the second configuration to the scheduled node after an uncoordinated communication (e.g. transmission 523) with the scheduled node.

In a further aspect, still referring to FIG. 5B, the scheduled node 504 may opportunistically communicate with scheduling node 502 based on whether the uplink transmission is dynamically scheduled or semi-statically configured. If the uplink transmission is dynamically scheduled (e.g. using a DCI sent from scheduling node 502), the scheduled node 504 may communicate over the second set of resources based on the second configuration as described above. Alternatively, if the uplink transmission is semi-statically configured or scheduled (e.g. the communication is a RACH transmission, a SRS, a SR, or other RRC-configured signal not dynamically scheduled by a DCI), the scheduled node 504 may similarly opportunistically communicate over the second set of resources based on the second configuration (e.g. a transmission power) different than the first configuration used in non-opportunistic communication.

For example, when opportunistically sending an uplink transmission to the scheduling node 502, the scheduled node 504 may perform a back off 538 of its transmission power normally used for non-opportunistic communications. For instance, the scheduled node 504 may communicate with scheduling node 502 over the second set of resources using lower transmission power than over the first set of resources. If the transmission power of the first configuration already has a back off, the back off 538 of the second configuration may be additionally reduced in transmission power compared to the first configuration.

Moreover, when opportunistically sending an uplink transmission to the scheduling node 502, the scheduled node 504 may iteratively change 540 its transmission power based on whether its communication is successful according to a different power control scheme than that used for non-opportunistic communications. For instance, when sending RACH transmissions, the scheduled node 504 may initially send a RACH preamble with a transmission power at an initial configuration (e.g. a low transmission power), and if the transmission is unsuccessful, the scheduled node may ramp up or increase the transmission power at fixed increments which are smaller than the increments used for normal RACH transmission. These smaller increments may provide more efficient power usage in opportunistic communications, where even if the transmission power is sufficiently large for the signal to be detected, the scheduling node 502 may fail to receive the preamble because it is unavailable for communication.

The second configuration (e.g. the backed off transmission power and/or iteratively changed transmission power) may be preconfigured, or it may be received by the scheduled node 504 from a network or base station (e.g. donor base station 509 or scheduling node 502). For example, referring to FIG. 4, DU 414 in IAB-node 404b may receive information regarding the back off amount and fixed increment for the transmission power from CU 408 in IAB-donor node 402, or from DU 414 in IAB-node 404a. Alternatively, the scheduled node 504 (e.g. MT 412 or UE 406 in FIG. 4) may autonomously determine the second configuration when attempting to opportunistically communicate with the scheduling node 502. For example, the scheduled node 504 may itself determine the amount of the back off or increments for its transmission power. However, if the second configuration is autonomously determined, the scheduling node 502 may not be aware of the second configuration, leading to possible misinterpretations of transmissions as discussed above.

To prevent such misinterpretation, the scheduled node 504 may indicate 542 the second configuration to the scheduling node 502. Moreover, to increase the chance this indication 542 will be received successfully, the indication 542 may be communicated using the first set of resources. For example referring to FIG. 4, UE 406 or MT 412 of IAB-node 404b may send to the DU 414 of IAB-node 404a using the available set of resources 428 information regarding the different transmission power which will be used for opportunistic communication. The scheduled node may send the indication 542 of the second configuration to the scheduling node after an uncoordinated communication (e.g. transmission 529) with the scheduling node.

Referring now to FIG. 5C, in an additional aspect, the scheduling node 502 and scheduled node 504 may opportunistically communicate over the second set of resources using one or more transmission beams or reception beams which are different than those associated with the first set of resources in non-opportunistic communication. Thus, FIG. 5C illustrates the scheduling node 502 sending downlink transmissions 512 and/or receiving uplink transmissions 514 over the first set of resources using a first beam 544 (e.g. in the first configuration) and over the second set of resources using a second beam 546 (e.g. in the second configuration). Similarly, FIG. 5 illustrates the scheduled node 504 sending uplink transmissions 514 and/or receiving downlink transmissions 512 over the first set of resources using a first beam 548 (e.g. in the first configuration) and over the second set of resources using a second beam 550 (e.g. in the second configuration). The first beam 544, 548 and second beam 546, 550 may be transmission or reception beams.

In one example, the second beams 546, 550 may have a narrower beam width and/or lower transmission power than the first beams 544, 548. The second beams 546, 550 may thus be more directed than first beams 544, 548 and thus possibly limit more interference than the first beams, thereby increasing the chances of successful opportunistic communication between scheduling node 502 and scheduled node 504. In another example, the second beams 546, 550 may have a wider beam width than the first beams 544, 548. With wider beams, chances of mismatch in beam direction of second beams 546, 550 (e.g. transmission and reception) may thus be reduced, thereby also increasing the chance of successful opportunistic communication between the nodes. In a further example, the second beams 546, 550 may be selected from a different codebook than first beams 544, 548. The codebook may be used to configure second beams 546, 550 with nulling in one or more beam directions to reduce interference in opportunistic communications.

In addition to opportunistically communicating over the second set of resources using different beams than for coordinated communication, the scheduling node 502 and scheduled node 504 may adjust a timing reference used for that communication. To prevent collisions in non-opportunistic communications between nodes (e.g. where a child node transmits to another child node at the same time it receives from a parent node), a timing reference may be defined separately for different Tx/Rx modes: downlink transmission, downlink reception, uplink transmission, and uplink reception. This timing reference (e.g. timing reference 439 in FIG. 4) may be, for instance, a first slot with respect to a downlink transmission by a scheduling node, a second slot with respect to a downlink reception by a scheduled node, a third slot with respect to an uplink transmission by a scheduled node, and a fourth slot with respect to an uplink reception by a scheduling node. Such separate timing references may serve to avoid conflicts in coordinated communication between nodes when the scheduling node or scheduled node are determined to be half duplex, for example.

However, when prior coordination is lacking, the scheduling node or the scheduled node may adjust the timing reference for opportunistic communication (e.g. timing reference 449 in FIG. 4) differently than for coordinated communication. For instance, on the expectation that a scheduled node (or scheduling node) may have full duplex capability, the scheduling node (or scheduled node) may adjust the timing reference for a Tx/Rx mode to be aligned with one or more of the other aforementioned Tx/Rx modes. For example, the scheduling node or scheduled node may align a downlink transmission timing with an uplink transmission timing, or a downlink reception timing with an uplink reception timing, to allow for simultaneous Tx/Rx of the other node. Such aligned timing references may serve to facilitate uncoordinated communication between nodes when the scheduling node or scheduled node are capable of full duplexing.

In a further aspect, still referring to FIG. 5C, the scheduling node 502 and scheduled node 504 may perform measurements on a channel or link (e.g. child link 423 in FIG. 4) between the nodes and opportunistically communicate those measurements. For example, the scheduled node 504 (e.g. UE 406 in FIG. 4) may measure reference signal received power (RSRP) and report a channel quality indicator (CQI) to the scheduling node 502 (e.g. IAB-node 404a in FIG. 4) using the second set of resources. Similarly, scheduling node 502 may measure received signal strength indicator (RSSI) based on RSRP reported from scheduled node 504 over the second set of resources. Scheduling node 502 and scheduled node 504 may also measure beam quality of transmission and reception beams used for downlink transmissions 512 and/or uplink transmissions 514.

However, measurements or reports may be affected by the second configuration in opportunistic communication. For example, if a scheduling node 502 transmits using a second beam 546, 550 with lower transmission power than a first beam 544, 548, a scheduled node 504 measuring the quality of the second beam to report CQI may inaccurately assess the lower transmission power as path loss if it does not take the second configuration into account. Therefore, to improve accuracy, the present disclosure allows the scheduling node 502 to process measurements 552 associated with the second set of resources (e.g. measured in opportunistic communication) differently than based on the first configuration. Similarly, the present disclosure allows the scheduled node 504 to process measurements 554 associated with the second set of resources (e.g. measured in opportunistic communication) differently than based on the first configuration.

In one example, measurements associated with the second set of resources may be combined differently with measurements associated with the first set of resources. For instance, a scheduling node 502 may communicate with a scheduled node 504 using the first set of resources in non-opportunistic communication and measure the quality of a first beam 544, 548 with a first transmission power (e.g. a first configuration). The scheduling node 502 and scheduled node 504 may subsequently communicate using the second set of resources in opportunistic communication and measure the quality of a resulting second beam 546, 550 with a second transmission power (e.g. a second configuration). If the second transmission power is measured to be lower than the first transmission power, the scheduling node 502 and scheduled node 504 may take this second configuration into account by combining the first and second measurements differently based on the second configuration. For example, the scheduling node 502 or scheduled node 504 may apply layer 3 filtering using a different filtering coefficient to calculate the measurement result depending on whether the first or second beam is used.

In another example, measurements associated with the second set of resources may be reported differently than measurements associated with the first set of resources. For instance, a scheduled node 504 may measure the RSRP of a first beam 544, 548 or reference signal transmitted using the first set of resources with a first transmission power (e.g. a first configuration) and report the measurement to the scheduling node 502 based on a triggered measurement reporting event (e.g. the first measurement is higher than a threshold). The scheduled node 504 may subsequently measure the RSRP of a second beam 546, 550 or reference signal transmitted using the second set of resources with a second transmission power (e.g. a second configuration) and report the measurement to the scheduling node 502 based on another triggered measurement reporting event (e.g. the second measurement is lower than a threshold). However, if the second beam's transmission power is reduced below the threshold based on the second configuration, the second RSRP measurement may be inaccurately reported although the true RSRP of the signal may be higher than the threshold. Therefore, the scheduled node 504 may take this second configuration into account by refraining from reporting the second measurement to the scheduling node 502, or by reporting the second measurement based on a separate rule than the first measurement. For example, the scheduled node 504 may adopt a rule that lowers the threshold of this measurement reporting event to reduce likelihood of inaccurate measurement reporting.

In a further example, an out-of-sync state or radio link failure (RLF) may be determined differently from measurements associated with the second set of resources than from measurements associated with the first set of resources. For instance, a scheduling node 502 or a scheduled node 504 may respectively measure the Signal to Interference & Noise Ratio (SINR) or RSRP of a first beam 544, 548 or reference signal transmitted using the first set of resources with a first transmission power (e.g. a first configuration). If this first measurement is higher than a certain limit, the scheduling node 502 or scheduled node 504 may not declare RLF. However, if the scheduling node 502 or scheduled node 504 respectively measures the SINR or RSRP of a second beam 546, 550 or reference signal transmitted using the second set of resources with a lower transmission power (e.g. a second configuration), the second measurement may be lower than this limit even though the true SINR or RSRP may be higher, leading to an inaccurate declaration of RLF. Therefore, the scheduling node 502 or scheduled node 504 may take this second configuration into account by refraining from declaring out of sync or RLF, or by declaring out of sync or RLF based on a separate rule than the first measurement. For example, the scheduling node 502 or scheduled node 504 may declare RLF only after measuring additional indications of SINR or RSRP under the limit or after waiting a longer time to collect these measurements.

Figure 6:
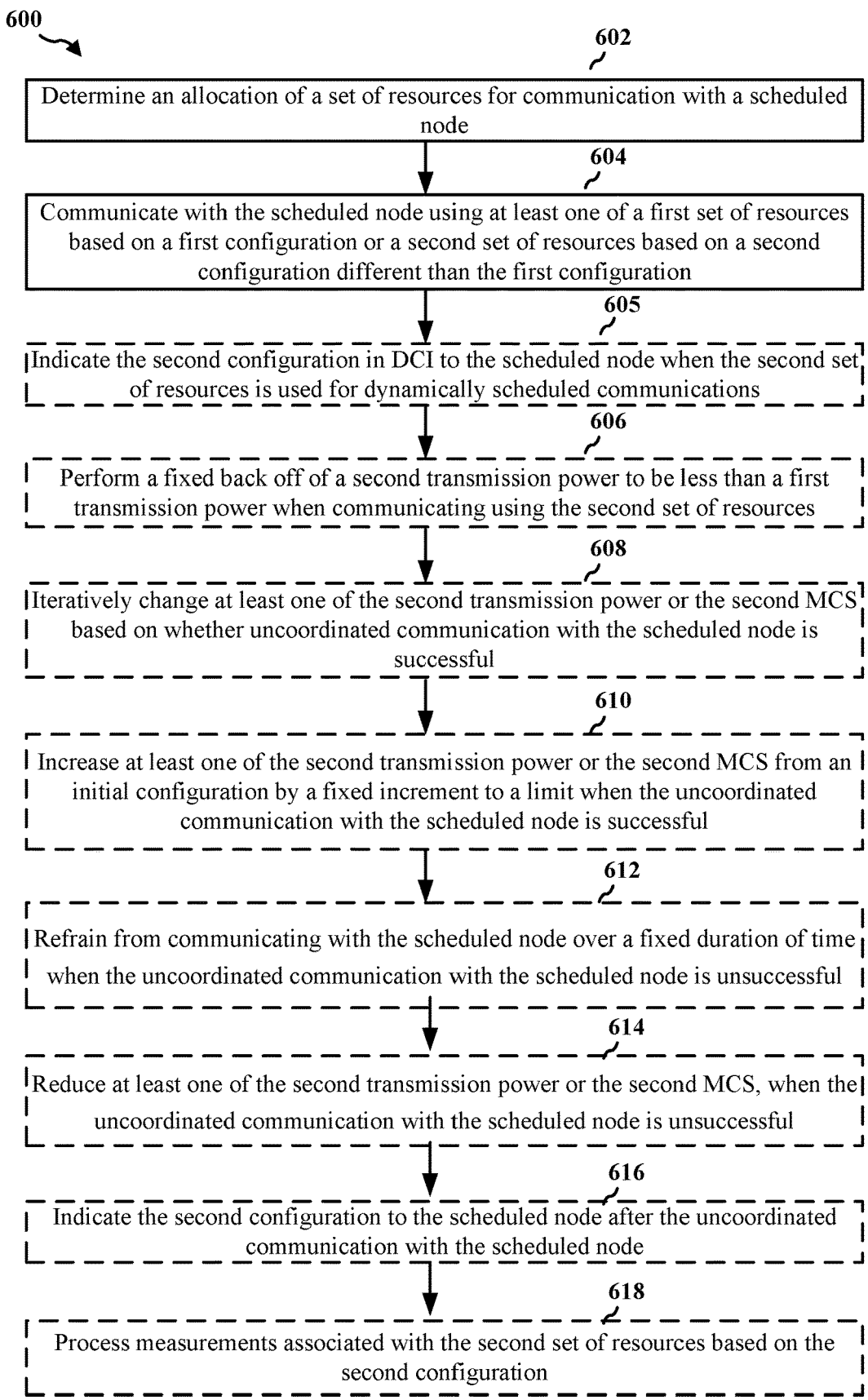
FIG. 6 is a flowchart of a method of wireless communication.

FIG. 6 is a flowchart 600 of a method of wireless communication. The method may be performed by a scheduling node (e.g., scheduling node 502). The scheduling node may be a base station (e.g. base station 102/180, 310, IAB node 404a; the apparatus 702/702'; the processing system 814, which may include the memory 376 and which may be the entire base station 310 or a component of the base station 310, such as the TX processor 316, the RX processor 370, and/or the controller/processor 375). Optional aspects are illustrated in dashed lines. The method allows a scheduling node to more efficiently opportunistically communicate with a scheduled node (e.g., scheduled node 504 or UE 104, 350, 406a,b or base station 102/180, 310, IAB node 404b) based on a different configuration for opportunistic communications than for coordinated communications.

At 602, the scheduling node determines an allocation of a set of resources for communication with a scheduled node. For example, 602 may be performed by a determination component 704 in FIG. 7. The allocation comprises at least a first set of resources and a second set of resources. The first set of resources is configured for coordinated communication between the scheduling node and the scheduled node, and the second set of resources is configured for uncoordinated communication between the scheduling node and the scheduled node. For example, referring to FIG. 5A, the scheduling node 502 determines an allocation of a set of resources 506 for communication with the scheduled node 504. The allocated set of resources 506 may include a first set of available resources for non-opportunistic or coordinated communication (e.g. available set of resources 428 in FIG. 4) which are associated with a first configuration (e.g. first configuration 430 in FIG. 4, e.g., a first modulation coding scheme (MCS) 432, a first beam 434, a first communication rank 436, a first resource configuration 418', or a first transmission power 438). The allocated set of resources 506 may also include a second set of resources for opportunistic or uncoordinated communication (e.g. allocated set of resources 416 in FIG. 4) which are associated with a second configuration (e.g. second configuration 440 in FIG. 4) when prior coordination between the nodes is lacking and either node 502, 504 may be potentially unavailable for communication.

In one aspect, the allocation of the set of resources is determined based on an indication received from a central unit (CU) of an IAB-donor (e.g. a first base station), where the scheduling node is an IAB-node (e.g. a second base station) including a distributed unit (DU) and a mobile termination unit (MT), and where the scheduled node is one of another IAB-node (e.g. a third base station) or a UE. The allocation of the set of resources received from the central unit may be semi-statically configured. For example, referring to FIGS. 4 and 5A, the first and second sets of resources (e.g. together the allocated set of resources 416 in FIG. 4) may be determined based on an indication received from a base station's CU (e.g. CU 408 of IAB-donor node 402 in FIG. 4). For example, scheduling node 502 may receive an indication 508 of the first and second set of resources from donor base station 509. The allocated set of resources 416 may be semi-statically allocated by the CU 408 for the scheduling node 502 (e.g. the IAB-node 404a including MT 412 and a DU 414) to use to communicate with the scheduled node 504 (e.g. the IAB-node 404b or UE 406).

The second configuration may comprise a resource configuration, where the resource configuration comprises a resource indication and a direction. The resource indication may comprise at least one of hard, soft, or unavailable, and the direction may comprise at least one of downlink, uplink, or flexible. For example, referring to FIG. 4, each time resource in the set of resources 416 allocated to a DU 414 is indicated or labeled with a resource configuration 418 including a resource indication 420 (e.g. hard, soft, or not-available) and a direction 422 (e.g. downlink, uplink, or flexible). The second configuration 440 may include the resource configuration 418.

The second set of resources may comprise a child set of resources allocated for communication of the scheduled node and a parent set of resources allocated for communication with the scheduled node. The child set of resources is the same as the parent set of resources. For example, referring to FIG. 4, a parent node (e.g. IAB-node 404a) may dynamically allocate (or receives allocation from the CU 408 of) a parent set of resources 424 and a child set of resources 426. The parent node may be the scheduling node 502 in FIG. 5A. The parent set of resources 424 is for the parent node to use in communicating with one of its child nodes (e.g. IAB-node 404b or UE 406). The child node may be the scheduled node 504 in FIG. 5A. The child set of resources 426 is for the child node (e.g. IAB-node 404b) to use when communicating with its own child nodes (e.g. UEs 406a,b). The parent set of resources 424 are the same as the child set of resources 426 and are both comprised within the allocated set of resources 416.

A child resource indication is associated with the child set of resources and a parent resource indication is associated with the parent set of resources. The child resource indication and the parent resource indication may be hard, soft, or unavailable. For example, referring to FIG. 4, the parent set of resources 424 and child set of resources 426 may both be associated with resource indications 420 which are labeled hard (e.g. HARD∥HARD). In another example, the child set of resources 426 may be associated with a resource indication 420 which is labeled soft (for example, HARD∥SOFT).

In one example, the second set of resources may be used to communicate with the scheduled node when the child resource indication is hard and the parent resource indication is hard. For example, referring to FIG. 4, if the allocated set of resources 416 is (HARD∥HARD), the parent node (e.g. IAB node 404a) and child node (e.g. IAB node 404b) may communicate over the child set of resources 426 based on the second configuration 440 if, for example, the child node has advanced spatial division multiplexing (SDM) and/or full-duplex capabilities, the child link 423 is idle, or the child node decides to prioritize communication with the parent node.

In another example, the child set of resources may be released for communication of the scheduled node when the child resource indication is soft. When the child set of resources is released by the scheduling node for the scheduled node to communicate with its own child node, the second set of resources may be used opportunistically by the scheduling node to communicate with the scheduled node. For example, referring to FIG. 4, if the allocated set of resources 416 is (HARD∥SOFT), the parent IAB-node 404a may release the child set of resources 426 for the child IAB-node 404b to flexibly use to communicate with its own children (e.g. UEs 406a,b). As a result, child IAB-node 404b may expect parent IAB-node 404a not to use its parent set of resources 424 to communicate with the child node 404b unless the parent node 404a reclaims the child set of resources 426. However, the parent node may opportunistically communicate with the child node based on the second configuration 440 without reclaiming the child set of resources 426.

In a further example, an uplink transmission may be received from the scheduled node over the child set of resources when the child resource indication is hard and the parent resource indication is hard. Referring to FIG. 4, if the allocated set of resources is (HARD∥HARD), the child IAB-node 404b may decide to send an uplink transmission to parent IAB-node 404a over the child set of resources 426. Although the parent IAB-node 404a expects the child node 404b to be unavailable for communication due to both resource indications 420 being labeled hard as described above, the parent IAB node 404a may opportunistically receive the uplink transmission based on the second configuration 440.

Additionally, of the set of resources may further comprise a third set of resources configured to be unavailable for communication with the scheduled node. For example, referring to FIG. 5A, the scheduling node 502 may determine an allocation of a third set of resources 510. This third set of resources 510 may be configured to be unavailable for communication with the scheduled node 504 (e.g. for use in backhaul communication of the scheduling node 502).

At 604, the scheduling node communicates with the scheduled node using at least one of the first set of resources based on a first configuration or the second set of resources based on a second configuration different than the first configuration. For example, 604 may be performed by a communication component 706 in FIG. 7. The first configuration may comprise at least one of a first modulation coding scheme (MCS), a first beam, a first communication rank, a first resource configuration, a first transmission power, or a first timing reference. The second configuration may comprise at least one of a second MCS, a second beam, a second communication rank, a second resource configuration, a second transmission power, or a second timing reference. For example, referring to FIG. 5A, once the set of resources 506 is allocated, the scheduling node 502 may communicate with the scheduled node 504 with prior coordination using the first set of resources (e.g. available set of resources 428 in FIG. 4) based on the first configuration 430 (e.g. a first modulation coding scheme (MCS) 432, a first beam 434, a first communication rank 436, a first resource configuration 418', a first transmission power 438, or a first timing reference 439), and opportunistically without prior coordination using the second set of resources (e.g. allocated set of resources 416 in FIG. 4) based on the second configuration 440 (e.g. a second MCS 442, a second beam 444, a second communication rank 446, a second resource configuration 418, a second transmission power 448, or a second timing reference 449) different than the first configuration 430. For example, the scheduling node 502 may send downlink transmissions 512 to the scheduled node 504 using either set of resources, and the scheduled node 504 may send uplink transmissions 514 to the scheduling node 502 using either set of resources. For instance, the scheduling node 502 may communicate using the first set of resources 428 and based on first configuration 430 when the scheduling node previously receives scheduled node information explicitly from the CU 408 in donor base station 509 or locally from the scheduled node 504, and the scheduling node 502 may communicate using the second set of resources 416 and based on second configuration 440 when the scheduling node does not previously receive scheduled node information (e.g. a duplexing or multiplexing capability of the scheduled node, conditions for the capability, and/or at least a subset of the resource configurations). The second configuration may be different than the first configuration in accordance with various aspects as illustrated in FIGS. 5B and 5C.

In one aspect, a subset of resources within the set of resources are dynamically scheduled for communicating with the scheduled node, or dynamically released for the scheduled node to use when the resource indication is soft. For instance, at 605, the scheduling node may indicate the second configuration in DCI to the scheduled node when the second set of resources is used for dynamically scheduled communications with the scheduled node. For example, referring to FIG. 4, the DU 414 of scheduling node 502 may dynamically allocate resources (e.g. child set of resources 426) within its allocated, semi-static set of resources 416 to schedule the communication of its scheduled node 504. Moreover, each DU 414 may dynamically release certain resources (e.g. child set of resources 426 having a soft resource indication 420) for the DU 414 of scheduled node 504 to use if the parent node does not need to use those resources. Thus, referring to FIG. 5B, the scheduling node 502 may dynamically schedule a downlink transmission to the scheduled node 504 and/or an uplink transmission from the scheduled node 504 over the second set of resources. In such case, the scheduling node 502 may indicate the second configuration in DCI 515 to the scheduled node 504. Moreover, the second configuration may be based on a link (e.g. child link 423 in FIG. 4) between the scheduling node 502 and the scheduled node 504.

As an example, at 606, the scheduling node may perform a fixed back off of the second transmission power to be less than the first transmission power when communicating using the second set of resources. For example, 606 may be performed by a back-off component 708 in FIG. 7. The second configuration comprises the second transmission power. For example, referring to FIG. 5B, when opportunistically sending a downlink transmission to the scheduled node 504, the scheduling node 502 may perform a back off 516 of its transmission power such that it is less than a transmission power used for non-opportunistic communications. For instance, the scheduling node 502 and scheduled node 504 may communicate within the second set of resources using lower transmission power than within the first set of resources. If the transmission power of the first configuration already has a back off, the back off 516, 518 of the second configuration may be additionally reduced in transmission power compared to the first configuration. Moreover, the back off 516, 518 may be fixed, for instance, the transmission power may be reduced by a fixed amount in each scheduled downlink or uplink communication.

As another example, at 608, the scheduling node may iteratively change at least one of the second transmission power or the second MCS based on whether the uncoordinated communication with the scheduled node is successful. For example, 608 may be performed by an iteration component 710 in FIG. 7. The second configuration may comprise the second transmission power and the second MCS. For example, referring to FIG. 5B, when opportunistically sending a downlink transmission to the scheduled node 504, the scheduling node 502 may iteratively change 520 its transmission power or MCS based on whether its communication is successful.

Moreover, at 610, the scheduling node may increase at least one of the second transmission power or the second MCS from an initial configuration by a fixed increment to a limit when the uncoordinated communication with the scheduled node is successful. Alternatively, at 612, the scheduling node may refrain from communicating with the scheduled node over a fixed duration of time when the uncoordinated communication is unsuccessful, or at 614, the scheduling node may reduce at least one of the second transmission power or the second MCS when the uncoordinated communication with the scheduled node is unsuccessful. For example, 610 may be performed by an increment component 712 in FIG. 7, 612 may be performed by a refrain component 714 in FIG. 7, and 614 may be performed by a reduction component 716 in FIG. 7.

For instance, referring to FIG. 5B, the scheduling node 502 may initially send a transmission 523 with a transmission power and/or MCS at an initial configuration (e.g. a low transmission power or a low coding rate). If the transmission 523 is successful, the scheduling node 502 may increase 524 the transmission power and/or MCS at fixed increments up to a predetermined limit. This incremental increase is based on the node's expectation that subsequent transmissions will also be successful, so more power or higher coding rate can be used. However, if the prior transmission 523 or a subsequent transmission 525 is unsuccessful, the scheduling node 502 may refrain 526 from attempting to communicate with the scheduled node 504 for a predetermined period of time, or may reduce 528 its transmission power and/or MCS until the transmission is successful. For example, the node may refrain from communicating after the initial communication attempt, and reduce its power or coding rate after subsequent communication attempts.

The second configuration indicated at 606, 608, 610, 612, and/or 614 may be preconfigured, received from a CU, or autonomously determined at the scheduling node. For example, referring to FIG. 5B, the second configuration (e.g. the backed off transmission power and/or iteratively changed transmission power and MCS) may be preconfigured, or it may be received at the scheduling node 502 by the DU from a network or base station (e.g. donor base station 509 including CU 408 in FIG. 4). The scheduling node 502 may also autonomously determine the second configuration (e.g. at DU 414 in FIG. 4) when attempting to opportunistically communicate with the scheduled node 504. For example, the scheduling node 502 may itself determine the amount of the back off or increments for its transmission power or MCS.

In another aspect, the second configuration may be determined at the scheduling node when the second set of resources is used for semi-statically configured communications with the scheduled node. For example, referring to FIG. 5B, the scheduling node 502 may send a semi-statically configured, downlink transmission to the scheduled node 504 using the second set of resources. In such case, the scheduling node 502 may opportunistically communicate with the scheduled node 504 similarly based on a second configuration (e.g. a transmission power, a beam, a communication rank, a resource indication, a timing reference, and/or a MCS) different than the first configuration used in non-opportunistic communication.

However, since transmissions in this aspect are semi-statically configured (without DCI), the scheduled node may not be aware of the second configuration, leading to possible misinterpretations of transmissions. Thus, at 616, the scheduling node may indicate the second configuration to the scheduled node. For example, 616 may be performed by an indication component 718 in FIG. 7. For instance, referring to FIG. 5B, the scheduling node 502 may indicate 536 the second configuration to the scheduled node 504 (e.g. separately from DCI). Moreover, to increase the chance this indication 536 will be received successfully, the indication 536 may be communicated using the first set of resources. The second configuration may be indicated after the uncoordinated communication with the scheduled node. For instance, referring to FIG. 5B, the indication 536 may be after an uncoordinated communication (such as transmission 523) to the scheduled node.

In a further aspect, when the first configuration comprises a first beam and the second configuration comprises a second beam, the second beam may comprise one of a transmission beam or a reception beam that is different than the first beam. For example, referring to FIG. 5C, the scheduling node 502 and scheduled node 504 may opportunistically communicate over the second set of resources using one or more transmission beams or reception beams which are different than those associated with the first set of resources in non-opportunistic communication. Thus, FIG. 5C illustrates the scheduling node 502 sending downlink transmissions 512 and/or receiving uplink transmissions 514 over the first set of resources using a first beam 544 (e.g. in the first configuration) and over the second set of resources using a second beam 546 (e.g. in the second configuration). The first beam 544, 548 and second beam 546, 550 may be transmission or reception beams.

For example, the second beam may have at least one of a narrower beam width or a lower transmission power than the first beam. For instance, referring to FIG. 5C, the second beams 546, 550 may have a narrower beam width and/or lower transmission power than the first beams 544, 548. The second beams 546, 550 may thus be more directed than first beams 544, 548 and thus possibly limit more interference than the first beams, thereby increasing the chances of successful opportunistic communication between scheduling node 502 and scheduled node 504.

In another example, the second beam may have a wider beam width than the first beam. For instance, referring to FIG. 5C, the second beams 546, 550 may have a wider beam width than the first beams 544, 548. With wider beams, chances of mismatch in beam direction of second beams 546, 550 (e.g. transmission and reception) may thus be reduced, thereby also increasing the chance of successful opportunistic communication between the nodes.

In a further example, the second beam may be selected from a different codebook than the first beam. The second beam may including nulling in one or more beam directions. For instance, referring to FIG. 5C, the second beams 546, 550 may be selected from a different codebook than first beams 544, 548. The codebook may be used to configure second beams 546, 550 with nulling in one or more beam directions to reduce interference in opportunistic communications.

Additionally, when the first configuration comprises a first timing reference and the second configuration comprises a second timing reference, the second timing reference may be adjusted to be different than the first timing reference. For example, referring to FIG. 4, timing reference 439 of first configuration 430 may be configured separately for different Tx/Rx modes (e.g., a first slot with respect to a downlink transmission by a scheduling node, a second slot with respect to a downlink reception by a scheduled node, a third slot with respect to an uplink transmission by a scheduled node, and a fourth slot with respect to an uplink reception by a scheduling node). In contrast, timing reference 449 of second configuration 440 may be adjusted to be the same for different Tx/Rx modes. For example, a downlink transmission timing may be aligned with an uplink transmission timing, or a downlink reception timing may be aligned with an uplink reception timing, in contrast to the first configuration where the timings may all be different or unaligned.

Finally, at 618, in an additional aspect, the scheduling node may process measurements associated with the second set of resources based on the second configuration. For example, 618 may be performed by measurement component 720 in FIG. 7. For instance, referring to FIG. 5C, the scheduling node 502 processes measurements 552 associated with the second set of resources (e.g. allocated set of resources 416 in FIG. 4) differently than based on the first configuration. In one example of this processing, the measurements may be one of combined or filtered with other measurements associated with the first set of resources. For instance, the scheduling node 502 may apply layer 3 filtering using a different filtering coefficient to calculate the measurement result depending on whether the first beam 544, 548 or second beam 546, 550 is used. In another example of this processing, the measurements may be one of: refrained from being reported, or reported based on a separate rule than for other measurements associated with the first set of resources. For instance, the scheduling node 502 may refrain from reporting a measurement of the second beam 546, 550, or report this measurement based on a separate rule (e.g. a higher or lower threshold for a corresponding measurement reporting event, etc.) than for a measurement of the first beam 544, 548. In a further example of this processing, at least one of an out-of-sync state or a radio link failure (RLF) may be one of: refrained from being determined from the measurements, or determined from the measurements based on a separate rule than for other measurements associated with the first set of resources. For instance, the scheduling node 502 may refrain from declaring RLF based on low SINR or RSRP for a transmission using the second set of resources, or declare RLF only after measuring additional indications of SINR or RSRP or after waiting a longer time to collect these measurements.

Figure 7:
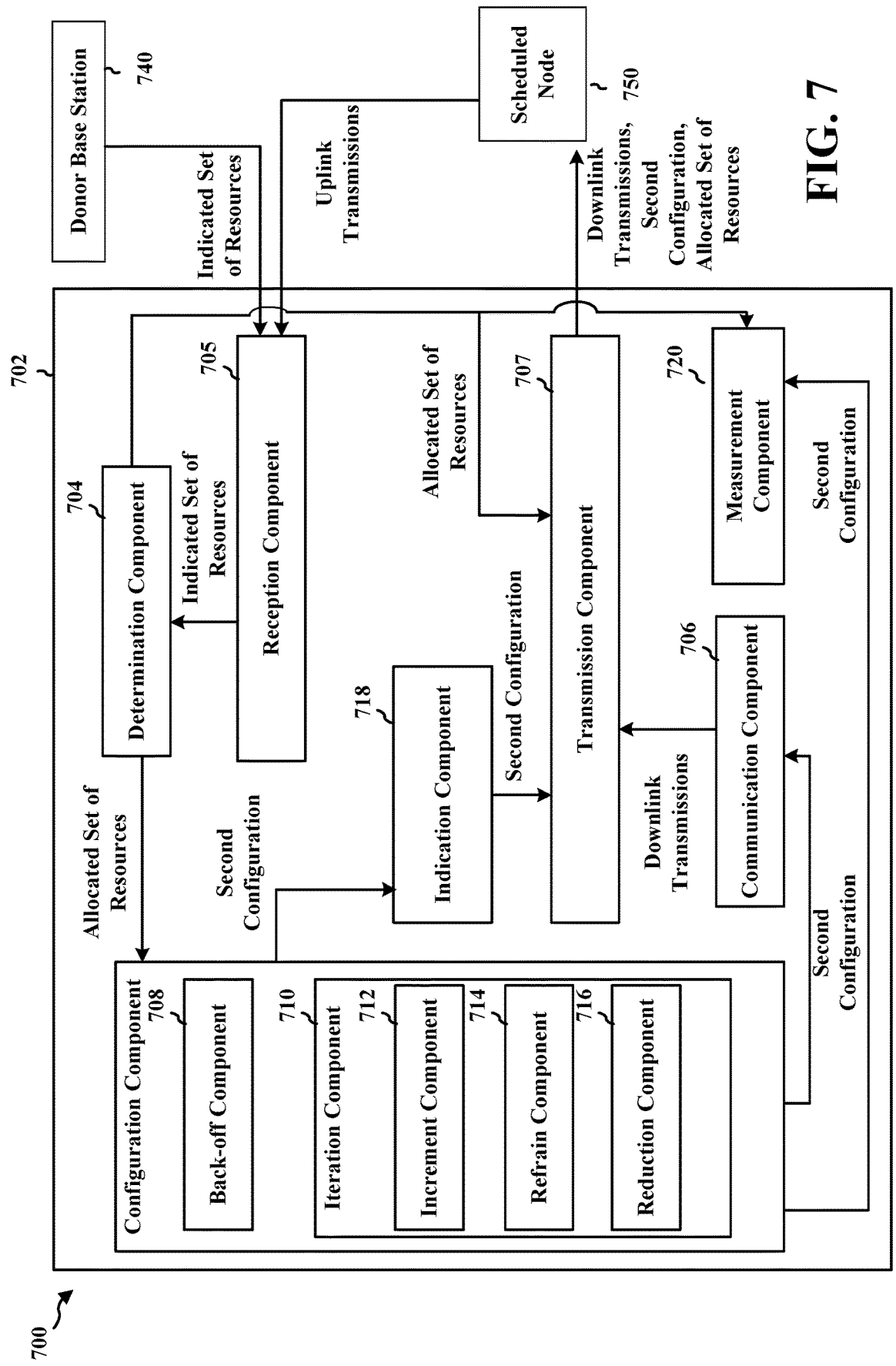
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a scheduling node (e.g. scheduling node 502). The apparatus includes a determination component 704 that determines an allocation of a set of resources for communication with a scheduled node 750 (e.g. scheduled node 504), e.g., as described in connection with 602 in FIG. 6. The allocated set of resources may be determined based on an indicated set of resources received, via a reception component 705, from a donor base station 740.

The apparatus includes the reception component 705 that receives uplink transmissions from a scheduled node 750. The reception component 705 also may receive the indicated set of resources form the donor base station 740.

The apparatus includes a communication component 706 that communicates with the scheduled node using at least one of the first set of resources or the second set of resources based on a second configuration different than a first configuration, e.g., as described in connection with 604 in FIG. 6. The communication component 706 may send downlink transmissions, via a transmission component 707, to the scheduled node 750. The communication component 706 may also send, via the transmission component 707, the second configuration and allocated set of resources to the scheduled node 750.

The apparatus includes the transmission component 707 that transmits downlink transmissions to the scheduled node 750. The transmission component 707 may also transmit the second configuration and allocated set of resources to the scheduled node 750.

The apparatus includes a configuration component which includes a back-off component 708 and an iteration component 710. The back-off component 708 performs a fixed back off of the second transmission power to be less than the first transmission power when communicating using the second set of resources, e.g., as described in connection with 606 in FIG. 6. The iteration component 710 iteratively changes at least one of the second transmission power or the second MCS based on whether the uncoordinated communication with the scheduled node is successful, e.g., as described in connection with 608 in FIG. 6.

The iteration component 710 includes an increment component 712 that increases at least one of the second transmission power or the second MCS from an initial configuration by a fixed increment to a limit when the uncoordinated communication with the scheduled node is successful, e.g., as described in connection with 610 in FIG. 6. The iteration component 710 also includes a refrain component 714 that refrains from communicating with the scheduled node over a fixed duration of time when the uncoordinated communication with the scheduled node is unsuccessful, e.g., as described in connection with 612 in FIG. 6. The iteration component 710 further includes a reduction component 716 that reduces at least one of the second transmission power or the second MCS when the uncoordinated communication with the scheduled node is unsuccessful, e.g., as described in connection with 614 in FIG. 6.

The apparatus includes an indication component 718 that indicates the second configuration to the scheduled node via the transmission component 707, e.g., as described in connection with 605 and 616 in FIG. 6. For instance, the indication component 718 may indicate the second configuration in DCI to the scheduled node when the second set of resources is used for dynamically scheduled communications with the scheduled node, e.g., as described in connection with 605 in FIG. 6, or may indicate the second configuration to the scheduled node after the uncoordinated communication with the scheduled node, e.g., as described in connection with 616 in FIG. 6. The apparatus also includes a measurement component 720 that processes measurements associated with the second set of resources based on the second configuration, e.g., as described in connection with 618 in FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
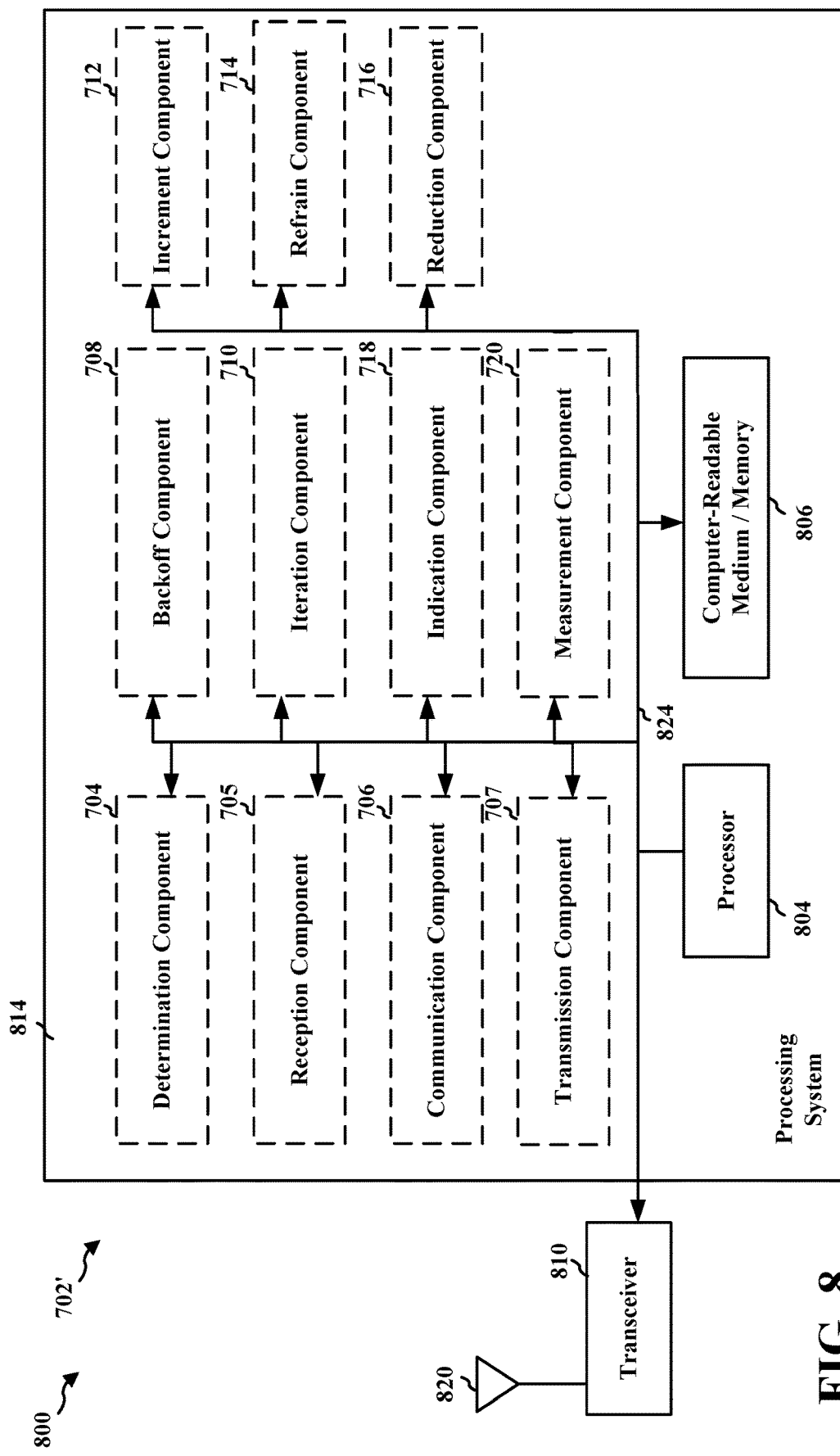
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 705, 706, 707, 708, 710, 712, 714, 716, 718, 720 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 705. In addition, the transceiver 810 receives information from the processing system 814, specifically the transmission component 707, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 705, 706, 707, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the IAB node (e.g. IAB node 404a) or the base station 310 and may include the memory 376 and/or at least one of the TX processor 316, the RX processor 370, and the controller/processor 375. Alternatively, the processing system 814 may be the entire IAB node or base station (e.g., see 310 of FIG. 3).

In one configuration, the apparatus 702/702' for wireless communication includes means for determining an allocation of a set of resources for communication with a scheduled node, the allocation comprising at least a first set of resources and a second set of resources, and means for communicating with the scheduled node using at least one of the first set of resources based on a first configuration or the second set of resources based on a second configuration different than the first configuration, wherein the first set of resources is configured for coordinated communication between the scheduling node and the scheduled node; and wherein the second set of resources is configured for uncoordinated communication between the scheduling node and the scheduled node.

In one configuration, the apparatus 702/702' for wireless communication may include means for indicating the second configuration in downlink control information (DCI) to the scheduled node when the second set of resources is used for dynamically scheduled communications with the scheduled node.

In one configuration, the apparatus 702/702' for wireless communication may include means for performing a fixed back off of the second transmission power to be less than the first transmission power when communicating using the second set of resources.

In one configuration, the apparatus 702/702' for wireless communication may include means for iteratively changing at least one of the second transmission power or the second MCS based on whether the uncoordinated communication with the scheduled node is successful. In one configuration, the apparatus may include means for increasing at least one of the second transmission power or the second MCS from an initial configuration by a fixed increment to a limit when the uncoordinated communication with the scheduled node is successful. In one configuration, the apparatus may include means for refraining from communicating with the scheduled node over a fixed duration of time, or means for reducing at least one of the second transmission power or the second MCS, when the uncoordinated communication with the scheduled node is unsuccessful.

In one configuration, the apparatus 702/702' for wireless communication may include means for indicating the second configuration to the scheduled node after the uncoordinated communication with the scheduled node.

In one configuration, the apparatus 702/702' for wireless communication may include means for processing measurements associated with the second set of resources based on the second configuration.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
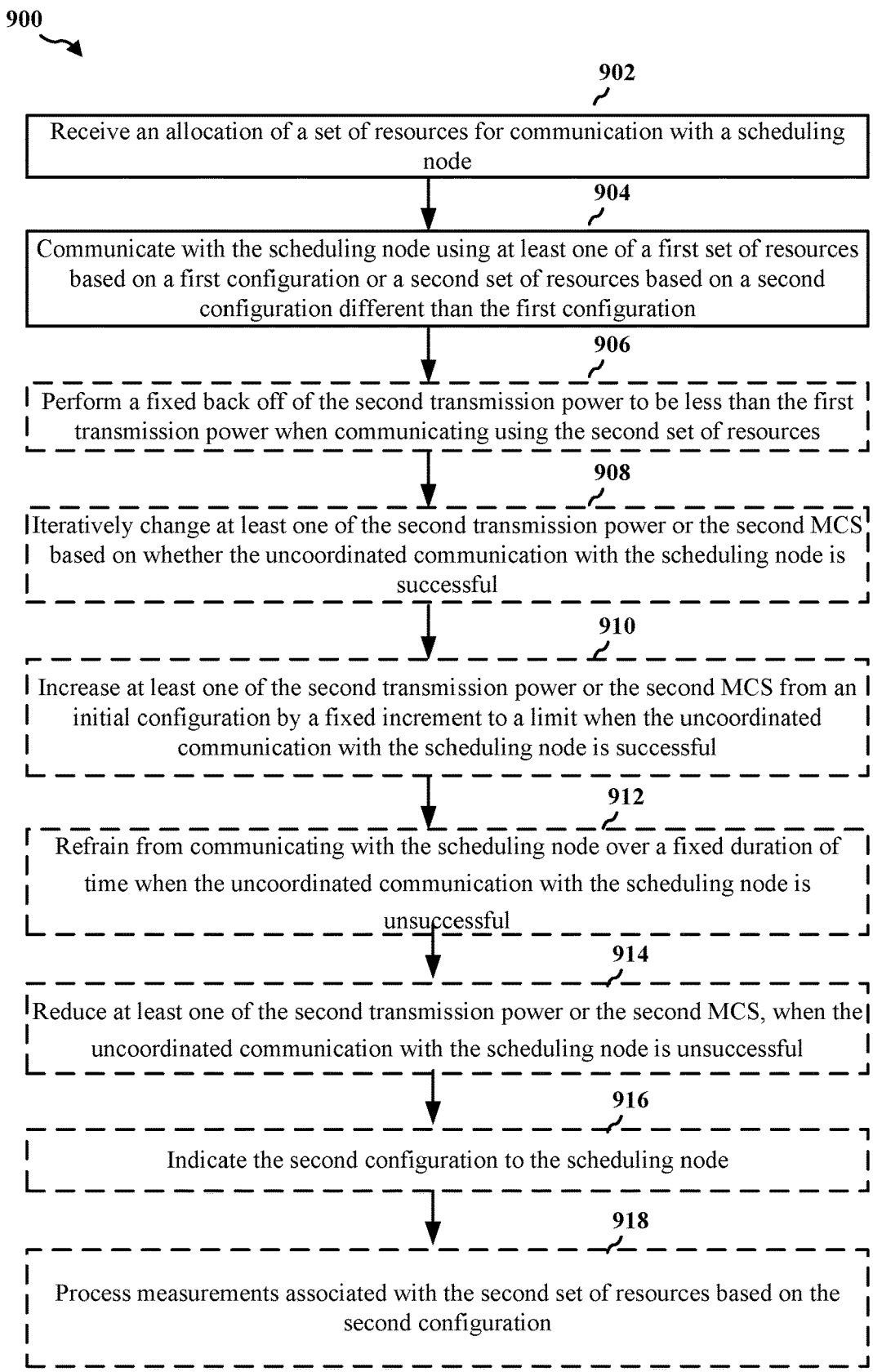
FIG. 9 is a flowchart of a method of wireless communication.

FIG. 9 is a flowchart 900 of a method of wireless communication. The method may be performed by a scheduled node (e.g. scheduled node 504). The scheduled node may be a UE or a base station or JAB node (e.g. JAB node 404b; the UE 104, 350, 406a,b; the base station 102/180, 310; the apparatus 1002/1002'; the processing system 1114, which may include the memory 360 or 376 and which may be the entire UE 350 or base station 310 or a component of the UE 350 or base station 310, such as the TX processor 368 or 316, the RX processor 356 or 370, and/or the controller/processor 359 or 375). Optional aspects are illustrated in dashed lines. The method allows a scheduled node to more efficiently opportunistically communicate with a scheduling node (e.g., scheduling node 502 or base station 102/180, 310, JAB node 404a) based on a different configuration for opportunistic communications than for coordinated communications.

At 902, the scheduled node receives an allocation of a set of resources for communication with a scheduling node. For example, 902 may be performed by a reception component 1004 in FIG. 10. The allocation comprises at least a first set of resources and a second set of resources. The first set of resources is configured for coordinated communication between the scheduling node and the scheduled node, and the second set of resources is configured for uncoordinated communication between the scheduling node and the scheduled node. For example, referring to FIG. 5A, the scheduled node 504 receives at 511 an allocated set of resources 506 for communication with the scheduling node 502. The allocated set of resources 506 may include a first set of available resources for non-opportunistic or coordinated communication (e.g. available set of resources 428 in FIG. 4) which are associated with a first configuration (e.g. first configuration 430 in FIG. 4, e.g., a first modulation coding scheme (MCS) 432, a first beam 434, a first communication rank 436, a first resource configuration 418', or a first transmission power 438). The allocated set of resources 506 may also include a second set of resources for opportunistic or uncoordinated communication (e.g. allocated set of resources 416 in FIG. 4) which are associated with a second configuration (e.g. second configuration 440 in FIG. 4) when prior coordination between the nodes is lacking and either node 502, 504 may be potentially unavailable for communication.

In one aspect, the allocation of the set of resources is received from a central unit (CU) of an IAB donor, where the scheduling node is an JAB node including a distributed unit (DU) and a mobile termination unit (MT), and where the scheduled node is one of another IAB node or a UE. The allocation of the set of resources received from the central unit may be semi-statically configured. For example, referring to FIG. 4, the first and second sets of resources (e.g. together the allocated set of resources 416 in FIG. 4) may be received based on an indication received from a base station's CU (e.g. CU 408 of IAB-donor node 402 in FIG. 4). For example, the CU 408 may semi-statically allocate a set of resources 416 to the DUs 414 for the IAB-nodes 404 (e.g. a scheduling node including IAB-node 404a) to use to communicate with their children (e.g. a scheduled node including UEs 406 or other IAB-nodes 404 such as IAB-node 404b). The CU 408 may also configure MTs 412 and UEs 406 with certain semi-static or RRC-configured schedules or time configurations, for example, a dedicated time-division duplexing (TDD) configuration, control-resource sets (CORESETs), or semi-persistent scheduling (SPS).

The second configuration may comprise a resource configuration, where the resource configuration comprises a resource indication and a direction. The resource indication may comprise at least one of hard, soft, or unavailable, and the direction may comprise at least one of downlink, uplink, or flexible. For example, referring to FIG. 4, each time resource in the set of resources 416 allocated to a DU 414 is indicated or labeled with a resource configuration 418 including a resource indication 420 (e.g. hard, soft, or not-available) and a direction 422 (e.g. downlink, uplink, or flexible). The second configuration 440 may include the resource configuration 418.

The second set of resources may comprise a child set of resources allocated for communication of the scheduled node with one or more other nodes and a parent set of resources allocated for backhaul communication with the scheduling node. The child set of resources is the same as the parent set of resources. For example, referring to FIG. 4, a parent node (e.g. IAB-node 404a) may dynamically allocate a parent set of resources 424 and a child set of resources 426. The parent node may be the scheduling node 502 in FIG. 5A. The parent set of resources 424 is for the parent node to use in communicating with one of its child nodes (e.g. IAB-node 404b or UE 406). The child node may be the scheduled node 504 in FIG. 5A. The child set of resources 426 is for the child node (e.g. IAB-node 404b) to use when communicating with its own child nodes (e.g. UEs 406a,b). The parent set of resources 424 are the same as the child set of resources 426 and are both comprised within the allocated set of resources 416.

A child resource indication is associated with the child set of resources and a parent resource indication is associated with the parent set of resources. The child resource indication and the parent resource indication may be hard, soft, or unavailable. For example, referring to FIG. 4, the parent set of resources 424 and child set of resources 426 may both be associated with resource indications 420 which are labeled hard (e.g. HARD∥HARD). In another example, the child set of resources 426 may be associated with a resource indication 420 which is labeled soft (for example, HARD∥SOFT).

In one example, the second set of resources may be used to communicate with the scheduling node when the child resource indication is hard and the parent resource indication is hard. For example, referring to FIG. 4, if the allocated set of resources 416 is (HARD∥HARD), the parent node (e.g. IAB node 404a) and child node (e.g. IAB node 404b) may communicate over the child set of resources 426 based on the second configuration 440 if, for example, the child node has advanced spatial division multiplexing (SDM) and/or full-duplex capabilities, the child link 423 is idle, or the child node decides to prioritize communication with the parent node.

In another example, the second set of resources may be used to communicate with the scheduling node when the child resource indication is soft and the child set of resources is indicated as released. For example, referring to FIG. 4, if the allocated set of resources 416 is (HARD∥SOFT), the parent IAB-node 404a may release the child set of resources 426 for the child IAB-node 404b to flexibly use to communicate with its own children (e.g. UEs 406a,b). As a result, child IAB-node 404b may expect parent IAB-node 404a not to use its parent set of resources 424 to communicate with the child node 404b unless the parent node 404a reclaims the child set of resources 426. However, the parent node may opportunistically communicate with the child node based on the second configuration 440 without reclaiming the child set of resources 426.

In a further example, an uplink transmission may be transmitted to the scheduling node over the child set of resources when the child resource indication is hard and the parent resource indication is hard. Referring to FIG. 4, if the allocated set of resources is (HARD∥HARD), the child IAB-node 404*b* may decide to send an uplink transmission to parent IAB-node 404*a* over the child set of resources 426. Although the parent IAB-node 404*a* expects the child node 404*b* to be unavailable for communication due to both resource indications 420 being labeled hard as described above, the parent IAB node 404*a* may opportunistically receive the uplink transmission based on the second configuration 440.

Additionally, the set of resources may further comprise a third set of resources configured to be unavailable for communication with the scheduling node. For example, referring to FIG. 5A, the scheduling node 502 may determine an allocation of a third set of resources 510. This third set of resources 510 may be configured to be unavailable for communication with the scheduled node 504 (e.g. for use in backhaul communication of the scheduling node 502). Thus, the third set of resources may similarly be unavailable for communication by the scheduled node 504 with the scheduling node 502.

At 904, the scheduled node communicates with the scheduling node using at least one of the first set of resources based on a first configuration or the second set of resources based on a second configuration different than the first configuration. For example, 904 may be performed by a communication component 1006 in FIG. 10. The first configuration may comprise at least one of a first modulation coding scheme (MCS), a first beam, a first communication rank, a first resource configuration, a first transmission power, or a first timing reference. The second configuration comprises at least one of a second MCS, a second beam, a second communication rank, a second resource configuration, a second transmission power, or a second timing reference. For example, referring to FIG. 5A, once the set of resources 506 is allocated, the scheduled node 504 may communicate with the scheduling node 502 with prior coordination using the first set of resources (e.g. available set of resources 428 in FIG. 4) based on the first configuration 430 (e.g. a first modulation coding scheme (MCS) 432, a first beam 434, a first communication rank 436, a first resource configuration 418', a first transmission power 438, or a first timing reference 439), and opportunistically without prior coordination using the second set of resources (e.g. allocated set of resources 416 in FIG. 4) based on the second configuration 440 (e.g. a second MCS 442, a second beam 444, a second communication rank 446, a second resource configuration 418, a second transmission power 448, or a second timing reference 449) different than the first configuration 430.

For example, the scheduling node 502 may send downlink transmissions 512 to the scheduled node 504 using either set of resources, and the scheduled node 504 may send uplink transmissions 514 to the scheduling node 502 using either set of resources. For instance, the scheduled node 504 may communicate using the first set of resources 428 and based on first configuration 430 when the scheduled node previously receives scheduling node information explicitly from the CU 408 in donor base station 509 or locally from the scheduling node 502, and the scheduled node 504 may communicate using the second set of resources 416 and based on second configuration 440 when the scheduled node does not previously receive scheduling node information (e.g. a duplexing or multiplexing capability of the scheduling node, conditions for the capability, and/or at least a subset of the resource configurations). The second configuration may be different than the first configuration in accordance with various aspects as illustrated in FIGS. 5B and 5C.

In one aspect, the second configuration is received in a downlink control information (DCI) from the scheduling node when the second set of resources is used for dynamically scheduled communications with the scheduling node. For example, referring to FIG. 4, the DU 414 of scheduling node 502 may dynamically allocate resources (e.g. child set of resources 426) within its allocated, semi-static set of resources 416 in a DCI to schedule the communication of its scheduled node 504. Thus, referring to FIG. 5B, the scheduling node 502 may dynamically schedule a downlink transmission to the scheduled node 504 and/or an uplink transmission from the scheduled node 504 over the second set of resources. In such case, the scheduling node 502 may indicate the second configuration in DCI 515 to the scheduled node 504. Moreover, the second configuration may be based on a link (e.g. child link 423 in FIG. 4) between the scheduling node 502 and the scheduled node 504. For instance, the scheduled node 504 may use adaptive modulation or coding (e.g. link adaptation) to send uplink transmissions respectively over this link based on channel conditions using a different, selected MCS than in the first configuration.

As an example, at 906, the scheduled node may perform a fixed back off of the second transmission power to be less than the first transmission power when communicating using the second set of resources. For example, 906 may be performed by a back-off component 1008 in FIG. 10. The second configuration comprises the second transmission power. For example, referring to FIG. 5B, when opportunistically sending an uplink transmission to the scheduling node 502, the scheduled node 504 may perform a back off 518 of its transmission power such that it is less than a transmission power used for non-opportunistic communications. For instance, the scheduling node 502 and scheduled node 504 may communicate within the second set of resources using lower transmission power than within the first set of resources. If the transmission power of the first configuration already has a back off, the back off 518 of the second configuration may be additionally reduced in transmission power compared to the first configuration. Moreover, the back off 518 may be fixed, for instance, the transmission power may be reduced by a fixed amount in each scheduled uplink communication.

As another example, at 908, the scheduled node may iteratively change at least one of the second transmission power or the second MCS based on whether the uncoordinated communication with the scheduling node is successful. For example, 908 may be performed by an iteration component 1010 in FIG. 10. The second configuration may comprise the second transmission power and the second MCS. For example, referring to FIG. 5B, when opportunistically sending an uplink transmission to the scheduling node 502, the scheduled node 504 may iteratively change 522 its transmission power or MCS based on whether its communication is successful.

Moreover, at 910, the scheduled node may increase at least one of the second transmission power or the second MCS from an initial configuration by a fixed increment to a limit when the uncoordinated communication with the scheduling node is successful. Alternatively, at 912, the scheduled node may refrain from communicating with the scheduling node over a fixed duration of time when the uncoordinated communication is unsuccessful, or at 914, the scheduled node may reduce at least one of the second transmission power or the second MCS when the uncoordinated communication with the scheduling node is unsuccessful. For example, 910 may be performed by an increment component 1012 in FIG. 10, 912 may be performed by a refrain component 1014 in FIG. 10, and 914 may be performed by a reduction component 1016 in FIG. 10.

For instance, referring to FIG. 5B, the scheduled node 504 may initially send a transmission 529 with a transmission power and/or MCS at an initial configuration. If the transmission 529 is successful, the scheduled node may increase 530 the transmission power and/or MCS at fixed increments up to a predetermined limit based on the node's expectation that subsequent transmissions will also be successful. If the prior or subsequent transmission 531 is unsuccessful, however, the scheduled node 504 may refrain 532 form attempting to communicate with the scheduling node 502 for a predetermined period of time or reduce 534 its transmission power and/or MCS until the transmission is successful.

The second configuration indicated at 906, 908, 910, 912, and/or 914 may be preconfigured or received from a CU, or received from the scheduling node. For example, referring to FIG. 5B, the second configuration (e.g. the backed off transmission power and/or iteratively changed transmission power and MCS) may be preconfigured, or it may be received at the scheduled node 504 by the DU from a network or base station (e.g. donor base station 509 including CU 408 in FIG. 4). The scheduling node 502 may also provide the second configuration to the scheduled node 504 (e.g. in downlink control information (DCI)), and the scheduled node 504 may receive the second configuration from the scheduling node 502 to use when attempting to opportunistically communicate with the scheduling node 502. For example, the scheduled node 504 may receive from the scheduling node 502 the amount of back off or increments for its transmission power or MCS to use when sending uplink transmissions to the scheduling node 502.

In another aspect, the second set of resources may be used for semi-statically configured communications with the scheduling node. For instance, the second configuration comprises a second transmission power, and the second transmission power is determined at the scheduled node when the set of resources is used to communicate semi-statically configured messages with the scheduling node. For example, referring to FIG. 5B, the scheduled node 504 may opportunistically communicate with scheduling node 502 based on whether the uplink transmission is dynamically scheduled or semi-statically configured. If the uplink transmission is semi-statically configured or scheduled (e.g. the communication is a RACH transmission, a SRS, a SR, or other RRC-configured signal not dynamically scheduled by a DCI), the scheduled node 504 may opportunistically communicate over the second set of resources based on the second configuration (e.g. a transmission power) different than the first configuration used in non-opportunistic communication.

In one example, a fixed back off of the second transmission power may be performed additionally with respect to the first transmission power. For example, referring to FIG. 5B, when opportunistically sending an uplink transmission to the scheduling node 502, the scheduled node 504 may perform a back off 538 of its transmission power normally used for non-opportunistic communications. For instance, the scheduled node 504 may communicate with scheduling node 502 over the second set of resources using lower transmission power than over the first set of resources. If the transmission power of the first configuration already has a back off, the back off 538 of the second configuration may be additionally reduced in transmission power compared to the first configuration.

In another example, the second transmission power may be iteratively changed based on whether the communication with the scheduling node is successful. For example, referring to FIG. 5B, when opportunistically sending an uplink transmission to the scheduling node 502, the scheduled node 504 may iteratively change 540 its transmission power based on whether its communication is successful according to a different power control scheme than that used for non-opportunistic communications. For instance, when sending RACH transmissions, the scheduled node 504 may initially send a RACH preamble with a transmission power at an initial configuration (e.g. a low transmission power), and if the transmission is unsuccessful, the scheduled node may ramp up or increase the transmission power at fixed increments which are smaller than the increments used for normal RACH transmission.

In the above examples, the second configuration may be preconfigured, received by a central unit (CU) of a base station or the scheduling node, or autonomously determined at the scheduled node. For example, referring to FIG. 5B, the second configuration (e.g. the backed off transmission power and/or iteratively changed transmission power) may be preconfigured, or it may be received by the scheduled node 504 from a network or base station (e.g. donor base station 509 or scheduling node 502). Alternatively, the scheduled node 504 (e.g. MT 412 or UE 406 in FIG. 4) may autonomously determine the second configuration when attempting to opportunistically communicate with the scheduling node 502. For example, the scheduled node 504 may itself determine the amount of the back off or increments for its transmission power.

However, if the second configuration is autonomously determined, the scheduling node may not be aware of the second configuration, leading to possible misinterpretations of transmissions. Thus, at 916, the scheduled node may indicate the second configuration to the scheduling node. For example, 916 may be performed by an indication component 1018 in FIG. 10. For instance, referring to FIG. 5B, the scheduled node 504 may indicate 542 the second configuration to the scheduling node 502. Moreover, to increase the chance this indication 542 will be received successfully, the indication 542 may be communicated using the first set of resources. The second configuration may be indicated after the uncoordinated communication when the second configuration is determined at the scheduled node. For instance, referring to FIG. 5B, the indication 536 may be after an uncoordinated communication (such as transmission 529) to the scheduling node.

In a further aspect, when the first configuration comprises a first beam and the second configuration comprises a second beam, the second beam may comprise one of a transmission beam or a reception beam that is different than the first beam. For example, referring to FIG. 5C, the scheduling node 502 and scheduled node 504 may opportunistically communicate over the second set of resources using one or more transmission beams or reception beams which are different than those associated with the first set of resources in non-opportunistic communication. Thus, FIG. 5C illustrates the scheduled node 504 sending uplink transmissions 514 and/or receiving downlink transmissions 512 over the first set of resources using a first beam 548 (e.g. in the first configuration) and over the second set of resources using a second beam 550 (e.g. in the second configuration). The first beam 544, 548 and second beam 546, 550 may be transmission or reception beams.

For example, the second beam may have at least one of a narrower beam width or a lower transmission power than the first beam. For instance, referring to FIG. 5C, the second beams 546, 550 may have a narrower beam width and/or lower transmission power than the first beams 544, 548. The second beams 546, 550 may thus be more directed than first beams 544, 548 and thus possibly limit more interference than the first beams, thereby increasing the chances of successful opportunistic communication between scheduling node 502 and scheduled node 504.

In another example, the second beam may have a wider beam width than the first beam. For instance, referring to FIG. 5C, the second beams 546, 550 may have a wider beam width than the first beams 544, 548. With wider beams, chances of mismatch in beam direction of second beams 546, 550 (e.g. transmission and reception) may thus be reduced, thereby also increasing the chance of successful opportunistic communication between the nodes.

In a further example, the second beam may be selected from a different codebook than the first beam. The second beam may including nulling in one or more beam directions. For instance, referring to FIG. 5C, the second beams 546, 550 may be selected from a different codebook than first beams 544, 548. The codebook may be used to configure second beams 546, 550 with nulling in one or more beam directions to reduce interference in opportunistic communications.

Additionally, when the first configuration comprises a first timing reference and the second configuration comprises a second timing reference, the second timing reference may be adjusted to be different than the first timing reference. For example, referring to FIG. 4, timing reference 439 of first configuration 430 may be configured separately for different Tx/Rx modes (e.g., a first slot with respect to a downlink transmission by a scheduling node, a second slot with respect to a downlink reception by a scheduled node, a third slot with respect to an uplink transmission by a scheduled node, and a fourth slot with respect to an uplink reception by a scheduling node). In contrast, timing reference 449 of second configuration 440 may be adjusted to be the same for different Tx/Rx modes. For example, a downlink transmission timing may be aligned with an uplink transmission timing, or a downlink reception timing may be aligned with an uplink reception timing, in contrast to the first configuration where the timings may all be different or unaligned.

Finally, at 918, in an additional aspect, the scheduled node may process measurements associated with the second set of resources based on the second configuration. For example, 918 may be performed by measurement component 1020 in FIG. 10. For instance, referring to FIG. 5C, the scheduled node 504 processes measurements 554 associated with the second set of resources (e.g. measured in opportunistic communication) differently than based on the first configuration. In one example of this processing, the measurements may be one of combined or filtered with other measurements associated with the first set of resources. For instance, the scheduled node 504 may apply layer 3 filtering using a different filtering coefficient to calculate the measurement result depending on whether the first beam 544, 548 or second beam 546, 550 is used. In another example of this processing, the measurements may be one of: refrained from being reported, or reported based on a separate rule than for other measurements associated with the first set of resources. For instance, the scheduled node 504 may refrain from reporting a measurement of the second beam 546, 550, or report this measurement based on a separate rule (e.g. a higher or lower threshold for a corresponding measurement reporting event, etc.) than for a measurement of the first beam 544, 548. In a further example of this processing, at least one of an out-of-sync state or a radio link failure (RLF) may be one of: refrained from being determined from the measurements, or determined from the measurements based on a separate rule than for other measurements associated with the first set of resources. For instance, the scheduled node 504 may refrain from declaring RLF based on low SINR or RSRP for a transmission using the second set of resources, or declare RLF only after measuring additional indications of SINR or RSRP or after waiting a longer time to collect these measurements.

Figure 10:
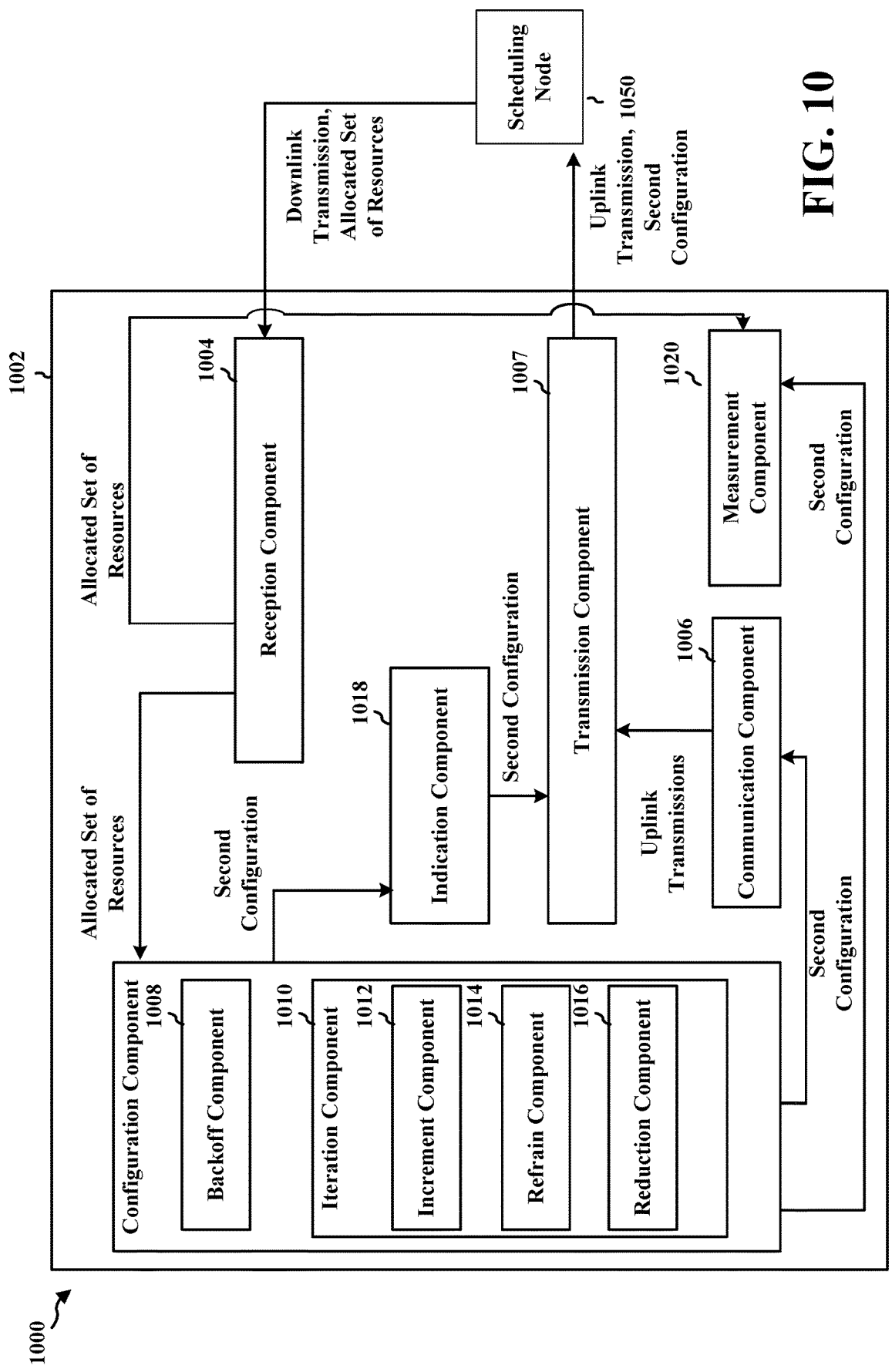
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a scheduled node (e.g. scheduled node 504). The apparatus includes a reception component 1004 that receives an allocation of a set of resources for communication with a scheduling node 1050 (e.g. scheduling node 502), e.g., as described in connection with 902 in FIG. 9. The reception component 1004 also receives downlink transmissions from the scheduling node 1050.

The apparatus includes a communication component 1006 that communicates with the scheduling node using at least one of the first set of resources or the second set of resources based on a second configuration different than a first configuration, e.g., as described in connection with 904 in FIG. 9. The communication component 1006 may send uplink transmissions, via a transmission component 1007, to the scheduling node 1050. The communication component 1006 may also send, via the transmission component 1007, the second configuration to the scheduling node 1050.

The apparatus includes the transmission component 1007 that transmits uplink transmissions to the scheduling node 1050. The transmission component 1007 may also transmit the second configuration to the scheduling node 1050.

The apparatus includes a configuration component which includes a back-off component 1008 and an iteration component 1010. The back-off component 1008 performs a fixed back off of the second transmission power to be less than the first transmission power when communicating using the second set of resources, e.g., as described in connection with 906 in FIG. 9. The iteration component 1010 iteratively changes at least one of the second transmission power or the second MCS based on whether the uncoordinated communication with the scheduling node is successful, e.g., as described in connection with 908 in FIG. 9.

The iteration component 1010 includes an increment component 1012 that increases at least one of the second transmission power or the second MCS from an initial configuration by a fixed increment to a limit when the uncoordinated communication with the scheduling node is successful, e.g., as described in connection with 910 in FIG. 9. The iteration component 1010 also includes a refrain component 1014 that refrains from communicating with the scheduling node over a fixed duration of time when the uncoordinated communication with the scheduling node is unsuccessful, e.g., as described in connection with 912 in FIG. 9. The iteration component 1010 further includes a reduction component 1016 that reduces at least one of the second transmission power or the second MCS when the uncoordinated communication with the scheduling node is unsuccessful, e.g., as described in connection with 914 in FIG. 9.

The apparatus includes an indication component 1018 that indicates the second configuration to the scheduling node via the transmission component 1007, e.g., as described in connection with 916 in FIG. 9. For instance, the indication component 1018 may indicate the second configuration to the scheduling node after the uncoordinated communication when the second configuration is determined at the scheduled node. The apparatus also includes a measurement component 1020 that processes measurements associated with the second set of resources based on the second configuration, e.g., as described in connection with 918 in FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
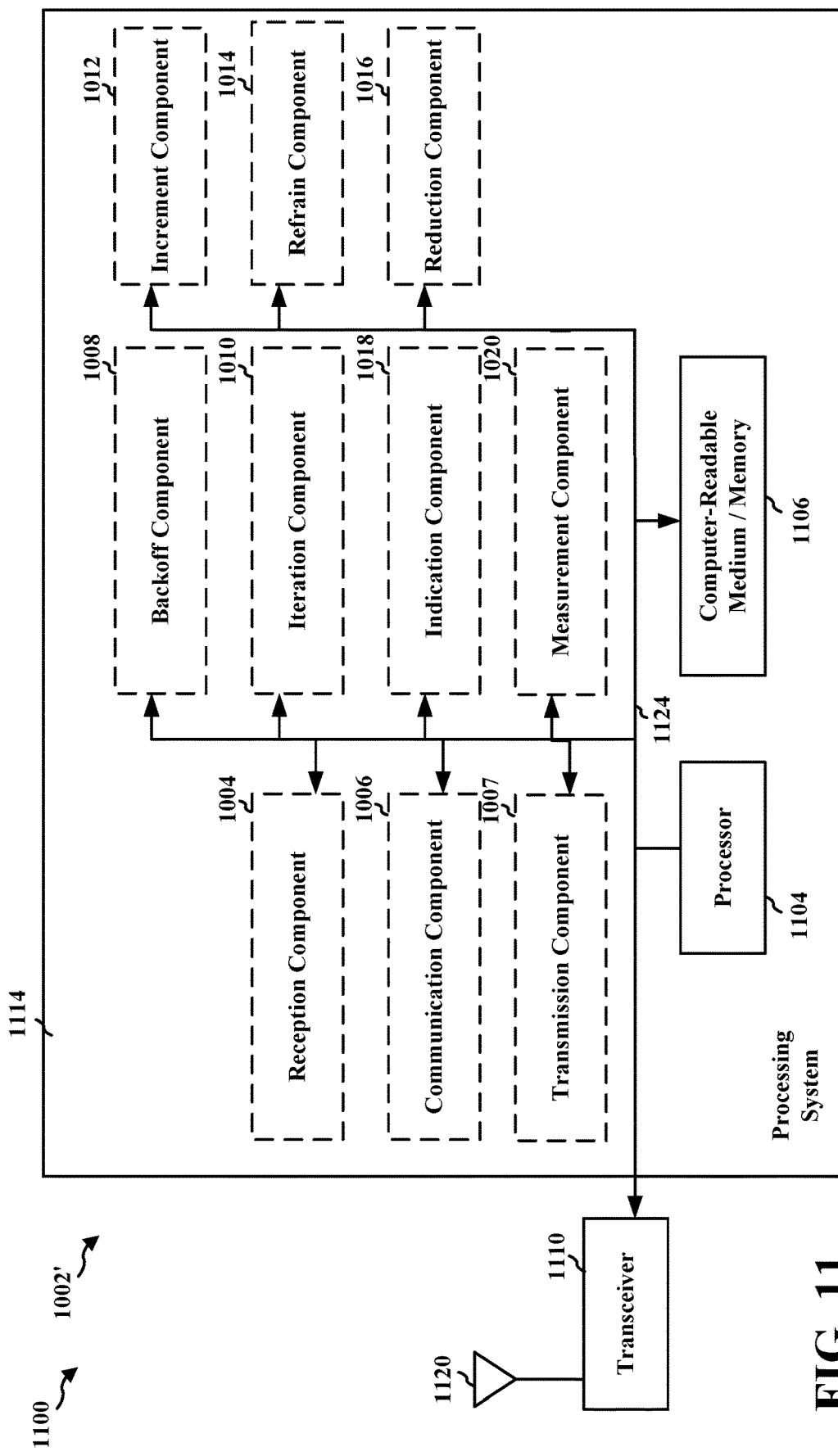
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1007, 1008, 1010, 1012, 1014, 1016, 1018, 1020 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1007, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1007, 1008, 1010, 1012, 1014, 1016, 1018, 1020. The components may be software components running in the processor 1104, resident/stored in the computer readable medium/memory 1106, one or more hardware components coupled to the processor 1104, or some combination thereof. The processing system 1114 may be a component of the IAB node (e.g. IAB node 404b) or the base station 310 and may include the memory 376 and/or at least one of the TX processor 316, the RX processor 370, and the controller/processor 375. Alternatively, the processing system 1114 may be the entire base station (e.g., see 310 of FIG. 3). The processing system 1114 may alternatively be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving an allocation of a set of resources for communication with a scheduling node, the allocation comprising at least a first set of resources and a second set of resources, and means for communicating with the scheduling node using at least one of the first set of resources based on a first configuration or the second set of resources based on a second configuration different than the first configuration, wherein the first set of resources is configured for coordinated communication between the scheduling node and the scheduled node; and wherein the second set of resources is configured for uncoordinated communication between the scheduling node and the scheduled node.

In one configuration, the apparatus 1002/1002' for wireless communication may include means for performing a fixed back off of the second transmission power to be less than the first transmission power when communicating using the second set of resources.

In one configuration, the apparatus 1002/1002' for wireless communication may include means for iteratively changing at least one of the second transmission power or the second MCS based on whether the uncoordinated communication with the scheduling node is successful. In one configuration, the apparatus may include means for increasing at least one of the second transmission power or the second MCS from an initial configuration by a fixed increment to a limit when the uncoordinated communication with the scheduling node is successful. In one configuration, the apparatus may include means for refraining from communicating with the scheduled node over a fixed duration of time, or means for reducing at least one of the second transmission power or the second MCS, when the uncoordinated communication with the scheduling node is unsuccessful.

In one configuration, the apparatus 1002/1002' for wireless communication may include means for indicating the second configuration to the scheduling node after the uncoordinated communication when the second configuration is determined at the scheduled node.

In one configuration, the apparatus 1002/1002' for wireless communication may include means for processing measurements associated with the second set of resources based on the second configuration.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In another configuration, as described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communication at a scheduling node, comprising:
    determining an allocation of a set of resources for communication with a scheduled node, the allocation comprising at least a first set of resources and a second set of resources; and
    communicating with the scheduled node using at least one of the first set of resources based on a first configuration or the second set of resources based on a second configuration different than the first configuration;
    wherein the first set of resources is configured for coordinated communication between the scheduling node and the scheduled node; and
    wherein the second set of resources is configured for uncoordinated communication between the scheduling node and the scheduled node.

2. The method of claim 1,
    wherein the allocation of the set of resources is determined based on an indication received from a central unit (CU) of an integrated access and backhaul (IAB) donor;
    wherein the scheduling node is an TAB node including a distributed unit (DU) and a mobile termination unit (MT); and
    wherein the scheduled node is one of another TAB node or a UE.

3. The method of claim 2, wherein the allocation of the set of resources received from the CU is semi-statically configured.

4. The method of claim 1, wherein the set of resources further comprises a third set of resources configured to be unavailable for communication with the scheduled node.

5. The method of claim 1,
    wherein the first configuration comprises at least one of a first modulation coding scheme (MCS), a first beam, a first communication rank, a first resource configuration, a first transmission power, or a first timing reference; and
    wherein the second configuration comprises at least one of a second MCS, a second beam, a second communication rank, a second resource configuration, a second transmission power, or a second timing reference.

6. The method of claim 5, further comprising:
    indicating the second configuration in downlink control information (DCI) to the scheduled node when the second set of resources is used for dynamically scheduled communications with the scheduled node.

7. The method of claim 6, further comprising:
    performing a fixed back off of the second transmission power to be less than the first transmission power when communicating using the second set of resources.

8. The method of claim 6, further comprising:
    iteratively changing at least one of the second transmission power or the second MCS based on whether the uncoordinated communication with the scheduled node is successful.

9. The method of claim 8, wherein the iteratively changing comprises:
    increasing at least one of the second transmission power or the second MCS from an initial configuration by a fixed increment to a limit when the uncoordinated communication with the scheduled node is successful; and
    refraining from communicating with the scheduled node over a fixed duration of time, or reducing at least one of the second transmission power or the second MCS, when the uncoordinated communication with the scheduled node is unsuccessful.

10. The method of claim 5, wherein the second configuration is preconfigured, received from a central unit (CU), or autonomously determined at the scheduling node.

11. The method of claim 5, wherein the second configuration is determined at the scheduling node when the second set of resources is used for semi-statically configured communications with the scheduled node, the method further comprising:

indicating the second configuration to the scheduled node after the uncoordinated communication with the scheduled node.

12. The method of claim 5, wherein the second beam comprises one of a transmission beam or a reception beam that is different than the first beam.

13. The method of claim 12, wherein the second beam has at least one of a narrower beam width or a lower transmission power than the first beam.

14. The method of claim 12, wherein the second beam has a wider beam width than the first beam.

15. The method of claim 12, wherein the second beam is selected from a different codebook than the first beam, the second beam including nulling in one or more beam directions.

16. The method of claim 5, wherein the second timing reference is adjusted to be different than the first timing reference.

17. The method of claim 1, further comprising:
processing measurements associated with the second set of resources based on the second configuration.

18. The method of claim 17, wherein the measurements are one of combined or filtered with other measurements associated with the first set of resources.

19. The method of claim 17, wherein the measurements are one of:
refrained from being reported; or
reported based on a separate rule than for other measurements associated with the first set of resources.

20. The method of claim 17, wherein at least one of an out-of-sync state or a radio link failure (RLF) is one of:
refrained from being determined from the measurements; or
determined from the measurements based on a separate rule than for other measurements associated with the first set of resources.

21. An apparatus for wireless communication, the apparatus being a scheduling node, comprising:
means for determining an allocation of a set of resources for communication with a scheduled node, the allocation comprising at least a first set of resources and a second set of resources; and
means for communicating with the scheduled node using at least one of the first set of resources based on a first configuration or the second set of resources based on a second configuration different than the first configuration;
wherein the first set of resources is configured for coordinated communication between the scheduling node and the scheduled node; and
wherein the second set of resources is configured for uncoordinated communication between the scheduling node and the scheduled node.

22. The apparatus of claim 21,
wherein the first configuration comprises at least one of a first modulation coding scheme (MCS), a first beam, a first communication rank, a first resource configuration, a first transmission power, or a first timing reference; and
wherein the second configuration comprises at least one of a second MCS, a second beam, a second communication rank, a second resource configuration, a second transmission power, or a second timing reference.

23. The apparatus of claim 22, further comprising:
means for indicating the second configuration in downlink control information (DCI) to the scheduled node when the second set of resources is used for dynamically scheduled communications with the scheduled node.

24. The apparatus of claim 23, further comprising:
means for performing a fixed back off of the second transmission power to be less than the first transmission power when communicating using the second set of resources.

25. The apparatus of claim 23, further comprising:
means for iteratively changing at least one of the second transmission power or the second MCS based on whether the uncoordinated communication with the scheduled node is successful.

26. The apparatus of claim 25, further comprising:
means for increasing at least one of the second transmission power or the second MCS from an initial configuration by a fixed increment to a limit when the uncoordinated communication with the scheduled node is successful; and
means for refraining from communicating with the scheduled node over a fixed duration of time, or reducing at least one of the second transmission power or the second MCS, when the uncoordinated communication with the scheduled node is unsuccessful.

27. The apparatus of claim 22, further comprising:
means for indicating the second configuration to the scheduled node after the uncoordinated communication with the scheduled node;
wherein the second configuration is determined at the scheduling node when the second set of resources is used for semi-statically configured communications with the scheduled node.

28. The apparatus of claim 21, further comprising:
means for processing measurements associated with the second set of resources based on the second configuration.

29. An apparatus for wireless communication, the apparatus being a scheduling node, comprising:
a memory; and
at least one processor coupled to the memory and configured to:
determine an allocation of a set of resources for communication with a scheduled node, the allocation comprising at least a first set of resources and a second set of resources; and
communicate with the scheduled node using at least one of the first set of resources based on a first configuration or the second set of resources based on a second configuration different than the first configuration;
wherein the first set of resources is configured for coordinated communication between the scheduling node and the scheduled node; and
wherein the second set of resources is configured for uncoordinated communication between the scheduling node and the scheduled node.

30. The apparatus of claim 29,
wherein the allocation of the set of resources is determined based on an indication received from a central unit (CU) of an integrated access and backhaul (IAB) donor;
wherein the scheduling node is an IAB node including a distributed unit (DU) and a mobile termination unit (MT); and
wherein the scheduled node is one of another IAB node or a UE.

31. The apparatus of claim 30, wherein the allocation of the set of resources received from the CU is semi-statically configured.

32. The apparatus of claim 29, wherein the set of resources further comprises a third set of resources configured to be unavailable for communication with the scheduled node.

33. The apparatus of claim 29,
wherein the first configuration comprises at least one of a first modulation coding scheme (MCS), a first beam, a first communication rank, a first resource configuration, a first transmission power, or a first timing reference; and
wherein the second configuration comprises at least one of a second MCS, a second beam, a second communication rank, a second resource configuration, a second transmission power, or a second timing reference.

34. The apparatus of claim 33, wherein the at least one processor is further configured to:
indicate the second configuration in downlink control information (DCI) to the scheduled node when the second set of resources is used for dynamically scheduled communications with the scheduled node.

35. The apparatus of claim 34, wherein the at least one processor is further configured to:
perform a fixed back off of the second transmission power to be less than the first transmission power when communicating using the second set of resources.

36. The apparatus of claim 34, wherein the at least one processor is further configured to:
iteratively change at least one of the second transmission power or the second MCS based on whether the uncoordinated communication with the scheduled node is successful.

37. The apparatus of claim 36, wherein the at least one processor is further configured to:
increase at least one of the second transmission power or the second MCS from an initial configuration by a fixed increment to a limit when the uncoordinated communication with the scheduled node is successful; and
refrain from communicating with the scheduled node over a fixed duration of time, or reducing at least one of the second transmission power or the second MCS, when the uncoordinated communication with the scheduled node is unsuccessful.

38. The apparatus of claim 33, wherein the second configuration is preconfigured, received from a central unit (CU), or autonomously determined at the scheduling node.

39. The apparatus of claim 33, wherein the at least one processor is further configured to:
indicate the second configuration to the scheduled node after the uncoordinated communication with the scheduled node;
wherein the second configuration is determined at the scheduling node when the second set of resources is used for semi-statically configured communications with the scheduled node.

40. The apparatus of claim 33, wherein the second beam comprises one of a transmission beam or a reception beam that is different than the first beam.

41. The apparatus of claim 40, wherein the second beam has at least one of a narrower beam width or a lower transmission power than the first beam.

42. The apparatus of claim 40, wherein the second beam has a wider beam width than the first beam.

43. The apparatus of claim 40, wherein the second beam is selected from a different codebook than the first beam, the second beam including nulling in one or more beam directions.

44. The apparatus of claim 33, wherein the second timing reference is adjusted to be different than the first timing reference.

45. The apparatus of claim 29, wherein the at least one processor is further configured to:
process measurements associated with the second set of resources based on the second configuration.

46. The apparatus of claim 45, wherein the measurements are one of combined or filtered with other measurements associated with the first set of resources.

47. The apparatus of claim 45, wherein the measurements are one of:
refrained from being reported; or
reported based on a separate rule than for other measurements associated with the first set of resources.

48. The apparatus of claim 45, wherein at least one of an out-of-sync state or a radio link failure (RLF) is one of:
refrained from being determined from the measurements; or
determined from the measurements based on a separate rule than for other measurements associated with the first set of resources.

49. A computer-readable medium storing computer executable code, the code when executed by a processor cause the processor to:
determine an allocation of a set of resources for communication with a scheduled node, the allocation comprising at least a first set of resources and a second set of resources; and
communicate with the scheduled node using at least one of the first set of resources based on a first configuration or the second set of resources based on a second configuration different than the first configuration;
wherein the first set of resources is configured for coordinated communication between a scheduling node and the scheduled node; and
wherein the second set of resources is configured for uncoordinated communication between the scheduling node and the scheduled node.

50. A method of communication at a scheduled node, comprising:
receiving an allocation of a set of resources for communication with a scheduling node, the allocation comprising at least a first set of resources and a second set of resources; and
communicating with the scheduling node using at least one of the first set of resources based on a first configuration or the second set of resources based on a second configuration different than the first configuration;
wherein the first set of resources is configured for coordinated communication between the scheduling node and the scheduled node; and
wherein the second set of resources is configured for uncoordinated communication between the scheduling node and the scheduled node.

51. The method of claim 50,
wherein the allocation of the set of resources is received from a central unit (CU) of an integrated access and backhaul (IAB) donor;
wherein the scheduling node is an IAB node including a distributed unit (DU) and a mobile termination unit (MT); and wherein the scheduled node is one of another IAB node or a UE.

52. The method of claim 51, wherein the allocation of the set of resources received from the CU is semi-statically configured.

53. The method of claim 50, wherein the set of resources further comprises a third set of resources configured to be unavailable for communication with the scheduling node.

54. The method of claim 50,
wherein the first configuration comprises at least one of a first modulation coding scheme (MCS), a first beam, a first communication rank, a first resource configuration, a first transmission power, or a first timing reference; and
wherein the second configuration comprises at least one of a second MCS, a second beam, a second communication rank, a second resource configuration, a second transmission power, or a second timing reference.

55. The method of claim 54, wherein the second configuration is received in downlink control information (DCI) from the scheduling node when the second set of resources is used for dynamically scheduled communications with the scheduling node.

56. The method of claim 55, further comprising:
performing a fixed back off of the second transmission power to be less than the first transmission power when communicating using the second set of resources.

57. The method of claim 55, further comprising:
iteratively changing at least one of the second transmission power and the second MCS based on whether the uncoordinated communication with the scheduling node is successful.

58. The method of claim 57, wherein the iteratively changing comprises:
increasing at least one of the second transmission power and the second MCS from an initial configuration by a fixed increment to a limit when the uncoordinated communication with the scheduling node is successful; and
refraining from communicating with the scheduling node over a fixed duration of time, or reducing at least one of the second transmission power and the second MCS, when the uncoordinated communication with the scheduling node is unsuccessful.

59. The method of claim 55, wherein the second configuration is preconfigured, received from a central unit (CU), or autonomously determined at the scheduled node.

60. The method of claim 59, further comprising:
indicating the second configuration to the scheduling node after the uncoordinated communication when the second configuration is determined at the scheduled node.

61. The method of claim 54, wherein the second set of resources is used for semi-statically configured communications with the scheduling node.

62. The method of claim 54, wherein the second beam comprises one of a transmission beam or a reception beam that is different than the first beam.

63. The method of claim 62, wherein the second beam has at least one of a narrower beam width or a lower transmission power than the first beam.

64. The method of claim 62, wherein the second beam has a wider beam width than the first beam.

65. The method of claim 62, wherein the second beam is selected from a different codebook than the first beam, the second beam including nulling in one or more beam directions.

66. The method of claim 54, wherein the second timing reference is adjusted to be different than the first timing reference.

67. The method of claim 50, further comprising:
processing measurements associated with the second set of resources based on the second configuration.

68. The method of claim 67, wherein the measurements are one of combined or filtered with other measurements associated with the first set of resources.

69. The method of claim 67, wherein the measurements are one of:
refrained from being reported; or
reported based on a separate rule than for other measurements associated with the first set of resources.

70. The method of claim 67, wherein at least one of an out-of-sync state or a radio link failure (RLF) is one of:
refrained from being determined from the measurements; or
determined from the measurements based on a separate rule than for other measurements associated with the first set of resources.

71. An apparatus for wireless communication, the apparatus being a scheduled node, comprising:
means for receiving an allocation of a set of resources for communication with a scheduling node, the allocation comprising at least a first set of resources and a second set of resources; and
means for communicating with the scheduling node using at least one of the first set of resources based on a first configuration or the second set of resources based on a second configuration different than the first configuration;
wherein the first set of resources is configured for coordinated communication between the scheduling node and the scheduled node; and
wherein the second set of resources is configured for uncoordinated communication between the scheduling node and the scheduled node.

72. The apparatus of claim 71,
wherein the first configuration comprises at least one of a first modulation coding scheme (MCS), a first beam, a first communication rank, a first resource configuration, a first transmission power, or a first timing reference; and
wherein the second configuration comprises at least one of a second MCS, a second beam, a second communication rank, a second resource configuration, a second transmission power, or a second timing reference.

73. The apparatus of claim 72, further comprising:
means for performing a fixed back off of the second transmission power to be less than the first transmission power when communicating using the second set of resources.

74. The apparatus of claim 72, further comprising:
means for iteratively changing at least one of the second transmission power and the second MCS based on whether the uncoordinated communication with the scheduling node is successful.

75. The apparatus of claim 74, further comprising:
means for increasing at least one of the second transmission power and the second MCS from an initial configuration by a fixed increment to a limit when the uncoordinated communication with the scheduling node is successful; and
means for refraining from communicating with the scheduling node over a fixed duration of time, or reducing at least one of the second transmission power and the second MCS, when the uncoordinated communication with the scheduling node is unsuccessful.

76. The apparatus of claim 72, wherein the second configuration is preconfigured, received from a central unit (CU), or autonomously determined at the scheduled node.

77. The apparatus of claim 76, further comprising:
means for indicating the second configuration to the scheduling node after the uncoordinated communication when the second configuration is determined at the scheduled node.

78. The apparatus of claim 71, further comprising:
means for processing measurements associated with the second set of resources based on the second configuration.

79. An apparatus for wireless communication, the apparatus being a scheduled node, comprising:
a memory; and
at least one processor coupled to the memory and configured to:
receive an allocation of a set of resources for communication with a scheduling node, the allocation comprising at least a first set of resources and a second set of resources; and
communicate with the scheduling node using at least one of the first set of resources based on a first configuration or the second set of resources based on a second configuration different than the first configuration;
wherein the first set of resources is configured for coordinated communication between the scheduling node and the scheduled node; and
wherein the second set of resources is configured for uncoordinated communication between the scheduling node and the scheduled node.

80. The apparatus of claim 79,
wherein the allocation of the set of resources is received from a central unit (CU) of an integrated access and backhaul (IAB) donor;
wherein the scheduling node is an IAB node including a distributed unit (DU) and a mobile termination unit (MT); and
wherein the scheduled node is one of another IAB node or a UE.

81. The apparatus of claim 80, wherein the allocation of the set of resources received from the CU is semi-statically configured.

82. The apparatus of claim 79, wherein the set of resources further comprises a third set of resources configured to be unavailable for communication with the scheduling node.

83. The apparatus of claim 79,
wherein the first configuration comprises at least one of a first modulation coding scheme (MCS), a first beam, a first communication rank, a first resource configuration, a first transmission power, or a first timing reference; and
wherein the second configuration comprises at least one of a second MCS, a second beam, a second communication rank, a second resource configuration, a second transmission power, or a second timing reference.

84. The apparatus of claim 83, wherein the second configuration is received in downlink control information (DCI) from the scheduling node when the second set of resources is used for dynamically scheduled communications with the scheduling node.

85. The apparatus of claim 84, wherein the at least one processor is further configured to:
perform a fixed back off of the second transmission power to be less than the first transmission power when communicating using the second set of resources.

86. The apparatus of claim 84, wherein the at least one processor is further configured to:
iteratively change at least one of the second transmission power and the second MCS based on whether the uncoordinated communication with the scheduling node is successful.

87. The apparatus of claim 86, wherein the at least one processor is further configured to:
increase at least one of the second transmission power and the second MCS from an initial configuration by a fixed increment to a limit when the uncoordinated communication with the scheduling node is successful; and
refrain from communicating with the scheduling node over a fixed duration of time, or reducing at least one of the second transmission power and the second MCS, when the uncoordinated communication with the scheduling node is unsuccessful.

88. The apparatus of claim 83, wherein the second configuration is preconfigured, received from a central unit (CU), or autonomously determined at the scheduled node.

89. The apparatus of claim 88, wherein the at least one processor is further configured to:
indicate the second configuration to the scheduling node after the uncoordinated communication when the second configuration is determined at the scheduled node.

90. The apparatus of claim 83, wherein the second set of resources is used for semi-statically configured communications with the scheduling node.

91. The apparatus of claim 83, wherein the second beam comprises one of a transmission beam or a reception beam that is different than the first beam.

92. The apparatus of claim 91, wherein the second beam has at least one of a narrower beam width or a lower transmission power than the first beam.

93. The apparatus of claim 91, wherein the second beam has a wider beam width than the first beam.

94. The apparatus of claim 91, wherein the second beam is selected from a different codebook than the first beam, the second beam including nulling in one or more beam directions.

95. The apparatus of claim 83, wherein the second timing reference is adjusted to be different than the first timing reference.

96. The apparatus of claim 79, wherein the at least one processor is further configured to:
process measurements associated with the second set of resources based on the second configuration.

97. The apparatus of claim 96, wherein the measurements are one of combined or filtered with other measurements associated with the first set of resources.

98. The apparatus of claim 96, wherein the measurements are one of:
refrained from being reported; or
reported based on a separate rule than for other measurements associated with the first set of resources.

99. The apparatus of claim 96, wherein at least one of an out-of-sync state or a radio link failure (RLF) is one of:
refrained from being determined from the measurements; or
determined from the measurements based on a separate rule than for other measurements associated with the first set of resources.

100. A computer-readable medium storing computer executable code, the code when executed by a processor cause the processor to:
- receive an allocation of a set of resources for communication with a scheduling node, the allocation comprising at least a first set of resources and a second set of resources; and
- communicate with the scheduling node using at least one of the first set of resources based on a first configuration or the second set of resources based on a second configuration different than the first configuration;
- wherein the first set of resources is configured for coordinated communication between the scheduling node and a scheduled node; and
- wherein the second set of resources is configured for uncoordinated communication between the scheduling node and the scheduled node.

* * * * *